US 8,412,813 B2

(12) United States Patent
Carlson et al.

(10) Patent No.: US 8,412,813 B2
(45) Date of Patent: *Apr. 2, 2013

(54) CUSTOMIZABLE ASSET GOVERNANCE FOR A DISTRIBUTED REUSABLE SOFTWARE LIBRARY

(75) Inventors: Brent A. Carlson, Rochester, MN (US); Timothy J. Graser, Spring Valley, MN (US)

(73) Assignee: LogicLibrary, Inc., Rochester, MN (US)

( * ) Notice: Subject to any disclaimer, the term of this patent is extended or adjusted under 35 U.S.C. 154(b) by 1312 days.

This patent is subject to a terminal disclaimer.

(21) Appl. No.: 11/436,102

(22) Filed: May 17, 2006

(65) Prior Publication Data
US 2006/0265688 A1 Nov. 23, 2006
US 2010/0306730 A9 Dec. 2, 2010

Related U.S. Application Data

(63) Continuation-in-part of application No. 10/109,601, filed on Mar. 26, 2002, now Pat. No. 7,149,734, which is a continuation-in-part of application No. 10/100,749, filed on Mar. 18, 2002, now Pat. No. 7,322,024.

(60) Provisional application No. 60/682,937, filed on May 20, 2005.

(51) Int. Cl.
*G06F 15/173* (2006.01)
*G06F 7/00* (2006.01)
*G06F 9/44* (2006.01)

(52) U.S. Cl. .......... 709/224; 707/610; 717/120

(58) Field of Classification Search .......... 709/224; 707/10; 717/120
See application file for complete search history.

(56) References Cited

U.S. PATENT DOCUMENTS
5,361,355 A 11/1994 Kondo et al.
5,446,575 A 8/1995 Lysakowski, Jr.
(Continued)

FOREIGN PATENT DOCUMENTS
EP 0 667 572 A1 8/1995
EP 1 061 430 A1 12/2000
(Continued)

OTHER PUBLICATIONS
S. Jarzabek, "Domain Model—Driven Software Reengineering and Maintenance," Journal of Systems Software, vol. 20, No. 1, Jan. 1993, pp. 37-51.
(Continued)

*Primary Examiner* — Ranodhi Serrao
(74) *Attorney, Agent, or Firm* — Shumaker & Sieffert, P.A.

(57) ABSTRACT

In general, techniques are described that facilitate the reuse of software assets within an enterprise. A system, for example, is described that includes a repository to store artifacts, and an asset source to generate a software asset based on the artifacts. The system further includes an asset management system to receive the software asset from the asset source and store the software asset within an asset library. The system may further include a model having one or more elements, and an asset retrieval module to selectively retrieve a subset of the software assets from the asset library based on input from a user identifying one or more of the elements. The system may also include a subsystem that allows users to customize asset governance processes and tailor system behavior through an event-driven mechanism.

46 Claims, 11 Drawing Sheets

U.S. PATENT DOCUMENTS

| | | | |
|---|---|---|---|
| 5,642,511 A | 6/1997 | Chow et al. | |
| 5,867,707 A | 2/1999 | Nishida et al. | |
| 5,907,704 A | 5/1999 | Gudmundson et al. | |
| 5,980,096 A | 11/1999 | Thalhammer-Reyero | |
| 5,991,535 A | 11/1999 | Fowlow et al. | |
| 6,023,702 A | 2/2000 | Leisten et al. | |
| 6,055,543 A | 4/2000 | Christensen et al. | |
| 6,067,548 A | 5/2000 | Cheng | |
| 6,092,075 A | 7/2000 | Carey et al. | |
| 6,134,706 A | 10/2000 | Carey et al. | |
| 6,202,205 B1 | 3/2001 | Saboff et al. | |
| 6,230,315 B1 | 5/2001 | Nicholas | |
| 6,349,237 B1 | 2/2002 | Koren et al. | |
| 6,366,930 B1 | 4/2002 | Parker et al. | |
| 6,405,179 B1 | 6/2002 | Rebane | |
| 6,427,230 B1 | 7/2002 | Goiffon et al. | |
| 6,606,744 B1 | 8/2003 | Mikurak | |
| 6,640,249 B1 | 10/2003 | Bowman-Amuah | |
| 6,662,357 B1 | 12/2003 | Bowman-Amuah | |
| 6,678,882 B1 | 1/2004 | Hurley et al. | |
| 6,829,604 B1 | 12/2004 | Tifft | |
| 7,322,024 B2 | 1/2008 | Carlson et al. | |
| 2002/0073114 A1 | 6/2002 | Nicastro et al. | |
| 2002/0156702 A1* | 10/2002 | Kane | 705/27 |
| 2002/0158880 A1 | 10/2002 | Williams et al. | |
| 2002/0169658 A1 | 11/2002 | Adler | |
| 2003/0005412 A1 | 1/2003 | Eanes | |
| 2003/0046282 A1 | 3/2003 | Carlson et al. | |
| 2003/0182470 A1 | 9/2003 | Carlson et al. | |

FOREIGN PATENT DOCUMENTS

| | | |
|---|---|---|
| WO | WO 00/22518 | 4/2000 |
| WO | WO 02/41144 A1 | 5/2002 |
| WO | WO 02/061538 A2 | 8/2002 |
| WO | WO 03/005243 A1 | 1/2003 |

OTHER PUBLICATIONS

P. Devanbu et al., "Extracting Formal Domain Models from Existing Code for Generative Reuse," ACM SIGAPP Applied Computing Review, Special Issue on Open Perspectives in Software Reuse, vol. 5, No. 1, 1997, pp. 2-14.

R. Rada, "Software Reuse," Intellect™, Oxford, England, 1995, 81 pgs.

W. Frakes et al., "DARE: Domain analysis and reuse environment," Annals of Software Engineering, vol. 5, 1998, pp. 125-141.

International Report on Patentability dated Dec. 6, 2007, for corresponding International Application No. PCT/US2006/019189, 7 pgs.

International Search Report and Written Opinion for corresponding International Application No. PCT/US2006/019189, dated Aug. 31, 2006, 11 pages.

Supplementary Partial European Search Report dated May 18, 2007, for European Application No. 02744793.7, 5 pgs.

S. Jarzabek, "Domain Model-Driven Software Reengineering and Maintenance," Journal of Systems and Software USA, vol. 20, No. 1, 1993, pp. 37-51.

P. Devanbu et al., "Extracting Formal Domain Models from Existing Code for Generative Reuse," ACM SIGAPP Applied Computing Review, vol. 5, No. 1, 1997, pp. 2-14.

Naoto Itsuki et al., "A Component Reuse Method in Constructing Information Systems," NTT R&D, vol. 47, No. 8, 1998, pp. 877-882.

Notification of Official Action for Canadian Application No. 2,607,129 dated Jul. 20, 2010, 5 pp.

Office Action from related Canadian Application No. 2,607,129, dated May 8, 2012, 4 pages.

Reply to Canadian Official Action for Canadian Application Serial No. 2,607,129, dated Nov. 8, 2012, 15 pages.

* cited by examiner

CUSTOMIZABLE ASSET GOVERNANCE FOR A DISTRIBUTED REUSABLE SOFTWARE LIBRARY

RELATED APPLICATIONS

This application is a continuation-in-part of U.S. patent application Ser. No. 10/109,601, now U.S. Pat. No. 7,149,734, filed Mar. 26, 2002, which is a continuation-in part of U.S. application Ser. No. 10/100,749, now U.S. Pat. No. 7,322,024, filed Mar. 18, 2002.

This application claims the benefit of U.S. Provisional Application Ser. No. 60/682,937, filed May 20, 2005, the entire content of which is incorporated herein by reference.

TECHNICAL FIELD

The invention relates to computer software and, more particularly, systems for managing software assets.

BACKGROUND

Over the past decade, software development efforts within enterprises have grown tremendously, resulting in large volumes of software code, documentation, models, and other related electronic artifacts. A large enterprise, for example, may have a significant number of ongoing software development projects at any one time ranging in size from small projects involving a few programmers to massive endeavors involving hundreds of programmers.

In the past few years, there has been a tremendous amount of work in the area of software engineering and, in particular, the reuse of software across development projects. Reusing software can have significant advantages in, for example, reducing the resources, expense, and development time for a software project. Identifying artifacts for reuse from the various repositories of a given enterprise, however, can be a complex task. In addition to the problems involved in identifying a potentially massive number of artifacts, the artifacts are typically stored within repositories dispersed throughout the enterprise, and maintained by specialized development or operational environments.

SUMMARY

In general, the invention is directed to techniques that facilitate the reuse of software assets within an enterprise. A software asset, as used herein, refers to a set of one or more related electronic artifacts that have been created or harvested for the purpose of applying that asset repeatedly in subsequent development environments. Source code and binary code are examples of artifacts for software assets. Other examples of artifacts include related documentation, such as requirement specifications, design documents, operation manuals, and the like. Additional examples of artifacts include models, such as a process model, structural model, resource model, implementation model, and the like, that may include use cases, object models, collaboration diagrams, deployment models, and the like.

In another embodiment, a computer-implemented system comprises a set of repositories to store electronic artifacts, wherein at least a portion of the artifacts comprise software instructions. In addition, the system comprises a set of asset sources executing on one or more computers to monitor the repositories and to generate software assets in a normalized format automatically upon detecting a new or changed artifact in a respective one of the repositories, wherein each of the software assets represents a set of related artifacts in the repositories that are reusable in different software development environments. The system also comprises an asset management system executing on one or more computers to capture the software assets from the asset sources and to store the software assets in an asset library, wherein the asset management system performs a control process that governs how the asset management system captures the software assets and stores the software assets. The control process is customizable by an administrator of the asset management system.

In another embodiment, a method comprises performing a control process that governs how an asset management system captures software assets from a set of asset sources and publishes the software assets to an asset library, wherein the process is customizable by an administrator. The asset sources monitor one or more repositories and automatically generate software assets in a normalized format when the asset sources detect a new or changed artifact in the repositories. The software assets represent sets of related artifacts in the repositories that are reusable in different software development environments. Further, at least a portion of the artifacts comprise software instructions that are reusable in different development environments.

In another embodiment, a computer-readable medium comprises instructions. The instructions cause a processor to perform a control process that governs how an asset management system captures software assets from an asset source and publishes the asset to an asset library. The process is customizable by an administrator. The asset source monitors a repository and automatically generates a software asset in a normalized format when the asset source detects a new or changed artifact in the repository and the software asset represents a set of related artifacts in the repository that are reusable in different software development environments. In this embodiment at least a portion of the artifacts comprise software instructions.

The techniques described herein may offer one or more advantages. For example, an enterprise may make use of distributed asset sources to provide generalized interfaces to diverse repositories, and to generate software assets in a normalized form that complies with a data description language. The software assets may be generated, for example, in accordance with one or more asset templates that define schemas for the assets. A user, such as a library administrator, may readily modify the asset templates to easily control the content and structure of the reusable software assets. This level of abstraction can be leveraged to automate or semi-automate the process of capturing artifacts from the repositories. In this manner, the asset management system provides users with a centralized asset library that offers a consistent, normalized view of the artifacts maintained over the many diverse repositories. In addition, an enterprise can make use of the system for bulk entry of assets, thereby simplifying and accelerating the process of capturing legacy software assets within the enterprise.

The asset management system can be configured to provide a full range of asset capture activities, ranging from fully-automated asset capture to semi-automated or manual approaches that require at least some manual intervention during the capture process. Accordingly, the asset management system can be configured to automatically capture assets from the repositories and produce normalized assets, or to automatically require the augmentation of the assets with artifacts not present within the repositories.

Among many other possible advantages, the asset management system provides for the association of software assets captured from diverse repositories with elements of software models, such as a process model, a structural model, a resource model, an implementation model, and the like. Accordingly, users can develop specifications for software projects, for example, and easily identify reusable software assets within the asset library that may be leveraged for the project.

Further, in embodiments employing a production and deployment control module, users of the system can easily customize asset governance processes and extend the behavior of the system through an event driven mechanism. For example, the user could define custom groups of users to be informed when an asset is updated.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
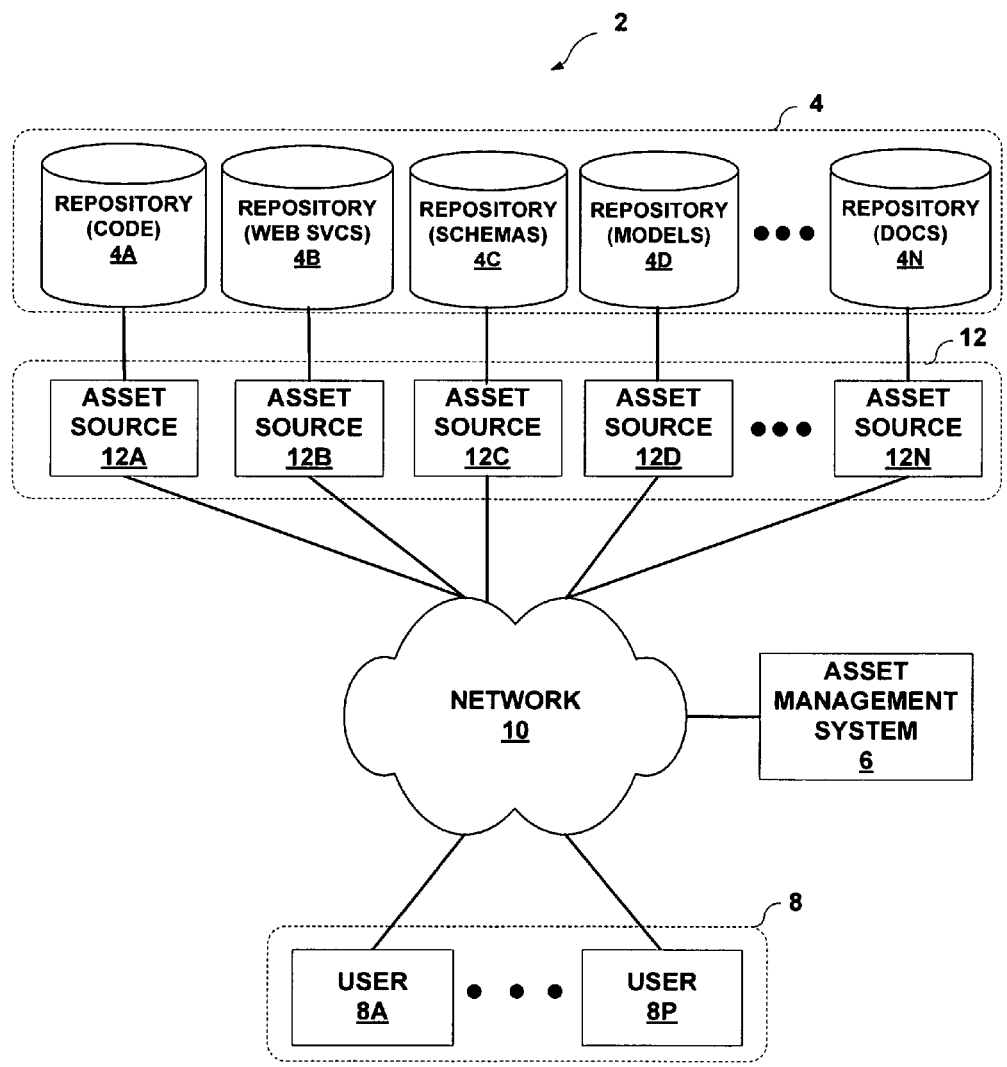
FIG. 1 is a block diagram illustrating an example system that facilitates the reuse of assets within an enterprise generally.

FIG. 1 is a block diagram illustrating an example system 2 that facilitates the reuse of software assets within an enterprise generally. In general, a reusable software asset, as used herein, refers to a set of related artifacts that have been created or harvested for the purpose of applying that asset repeatedly in different subsequent software development environments. Examples of artifacts for software assets include the source code or binary code for the software asset. Other examples include documentation such as a requirements specification, design document, and the like. Additional examples of artifacts include use cases, object models, collaboration diagrams, deployment models, and the like. Further examples include operational artifacts deployed within operational environments of the enterprise, such as component instances deployed within an application server.

Repositories 4A-4N (herein repositories 4) represent any data source within an enterprise that stores information (herein artifacts) relevant to the management of reusable assets. Repository 4A may store, for example, reusable modular software components that may be deployable as components of multiple software systems. These components may be independently deployable code elements that often conform to a standardized component model, such as Enterprise JavaBeans (EJB) and the Component Object Model (COM). These components typically have well-defined interfaces that provide access to the encapsulated services or functions. An example of this type of repository includes a source code development environment that often stores the source code and the executable code within a repository to provide version control and to facilitate collaborative development.

As another example, repository 4B may store code elements that present functional interfaces to web services (web svcs) for remote access by client software via networking protocols, such as HTTP, HTTPS, FTP, SOAP, XML messaging, and the like. The enterprise may make use of these assets for quickly assembling web-based applications. One example of this type of software asset includes a server-side code element for providing web-based financial transactions.

As another example, repository 4C may store schemas that conform to a data description language, such as XML, that can be used to assemble metadata for data transfer within the enterprise. Repository 4D may store modeling information (models) that provides formal representations of various software components. The modeling information may include use cases, object models, collaboration diagrams, deployment models, and the like. The modeling information may conform to the Unified Modeling Language (UML), for example. Repository 4N may store documentation related to the software components, including requirements specifications, design documents, and the like.

In addition, the artifacts stored by repositories 4 are not limited to those artifacts generated during the development of the software components, but can encompass artifacts related to the deployment of the asset, such as particular instances of the software components. Accordingly, system 2 can be used to aggregate artifacts generated through the lifecycle of the asset, including artifacts generated during the development of the asset through the deployment of various instances of the asset, and artifacts generated through ongoing tracking of that asset within the operational environment. Examples of operational artifacts deployed within operational environments of the enterprise include component instances deployed within an application server.

Repositories 4 may also comprise "active" repositories that manage data related to an asset in arbitrary form, and present "views" of that assemble the data into a consumable form. For example, a defect tracking system may manage any number of defects that can be organized into views related to specific assets, e.g., views that show only those defects pertinent to particular versions of assets under development.

Generally, these artifacts are likely developed and maintained within repositories 4 using specialized development tools. Accordingly, repositories 4 may comprise a variety of storage facilities having very diverse interfaces. System 2 makes use of one or more asset sources 12A-12N (herein asset sources 12) that provide a generalized, abstract interface to the underlying repositories 4. Asset sources 12 interact with repositories 4 to extract the artifacts, and assemble related artifacts to provide composite, normalized views of the reusable assets. In particular, asset sources 12 generate assets that describe related artifacts in repositories 4 in a normalized form.

Asset sources 12 output the software assets in a normalized form that complies with a data description language. In other words, the assets include or reference artifact data from repository 4A, as well as metadata that conforms to the data description language. The data description language describes the format, organization and structure of the asset. Accordingly, the normalized software assets produced by asset sources 12 may take the form of electronic documents, files, scripts, data streams, software objects, and the like, that contain the metadata conforming to the data description language. Other example languages include Extensible Style Language (XSL), Extensible Linking Language (XLL), Standardized Multimedia Authoring Language (SMIL), as well as variations of the Standard Generalized Markup Language (SGML).

As described in detail below, users 8A can readily tailor each of asset sources 12 to the particular requirements of the corresponding one of repositories 4. As described in detail below, users 8 may use asset definition templates to generically describe the normalized software assets produced by asset sources 12.

Asset management system 6 provides a centralized resource for collecting software assets from asset sources 12, and for publishing the software assets to users 8A-8P (herein users 8) within the enterprise. For instance, asset management system 6 may provide a comprehensive, searchable view of the software assets and related artifacts stored within the various repositories 4. By interacting with asset management system 6, users 8 can identify and utilize the assets.

System 2 may provide one or more advantageous features for capturing and managing reusable software assets. The use of asset sources 12 to provide a generalized interface to diverse repositories 4 can be leveraged to automate or semi-automate the process of capturing artifact information from repositories 4. Accordingly, an enterprise can make use of system 2 for bulk entry of assets, thereby simplifying and accelerating the process of capturing legacy software assets within the enterprise. In addition, asset management 6 and asset source 12 provide users 8 with a consistent, normalized view of the artifacts maintained over the many diverse repositories 4. Furthermore, asset management system 6 and asset sources 12 may interact so as to provide a current view of repositories 4, even though repositories 4 may change over time.

Furthermore, asset management system 6 and asset sources 12 can be configured to provide a full range of asset capture activities, ranging from fully-automated asset capture to semi-automated or manual approaches that requires at least some manual intervention of users 8 during the capture process. Accordingly, asset management system 6 and asset sources 12 automatically make available to users 8 assets that are automatically generated from repositories 4. In addition, asset management system 6 and asset sources 12 can be configured to allow users 8 to augment the assets with artifacts not present within repositories 12 during the capture process.

Figure 2:
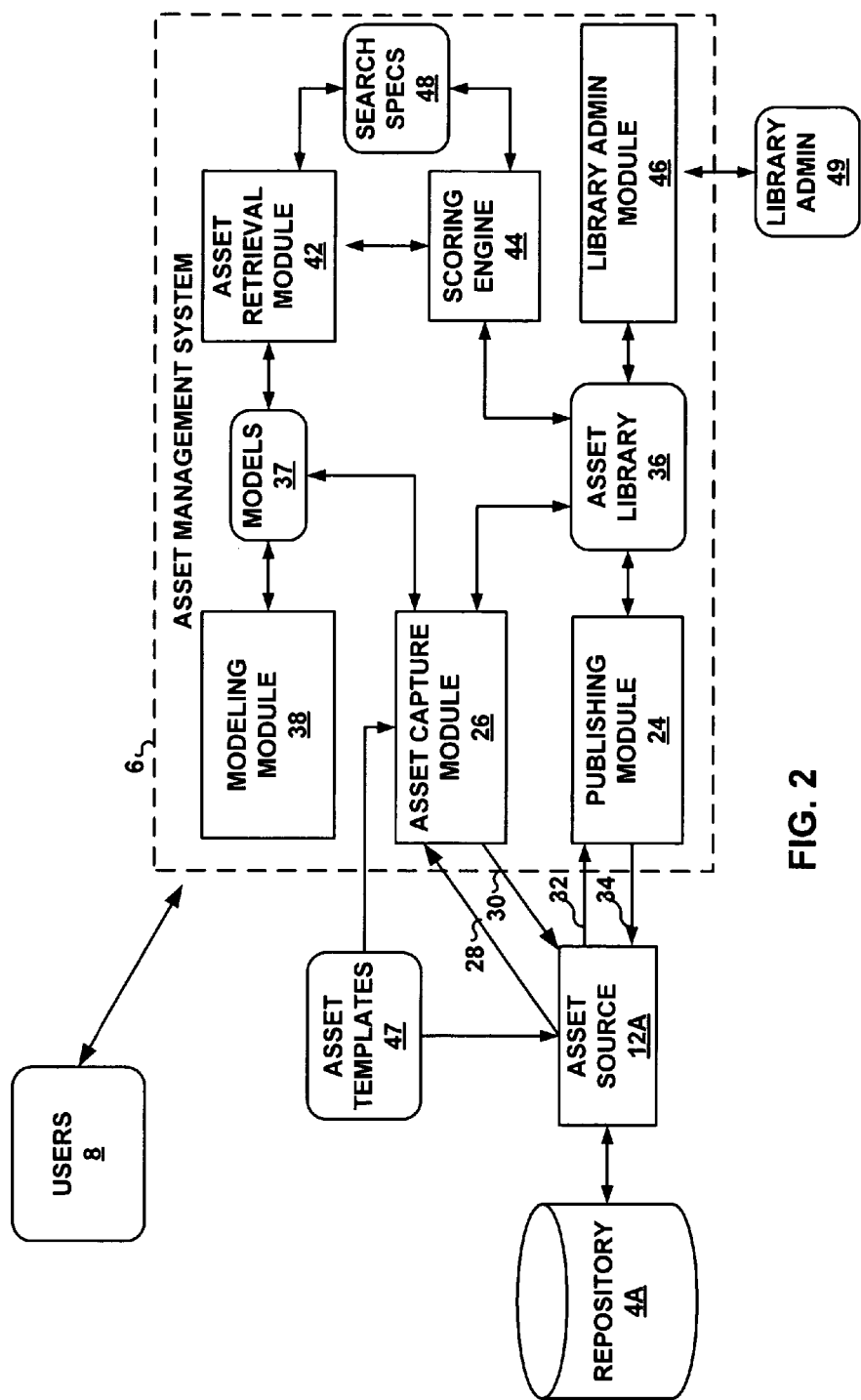
FIG. 2 is a block diagram illustrating an example embodiment of an asset management system.

FIG. 2 is a block diagram illustrating an example embodiment of asset management system 6 of FIG. 1. Asset management system 6 comprises a number of cooperative modules that facilitate the management of reusable software assets.

For example, asset management system 6 may include publishing module 24 and asset capture module 26 that interact with asset sources 12 to collect and aggregate artifacts from repositories 4 (FIG. 1), such as asset source 12A and repository 4A, as illustrated for exemplary purposes in FIG. 2. Generally, asset source 12A collects and normalizes assets from repository 4A. In addition, asset source 12A provides an abstract interface for interaction with publishing module 24 and asset capture module 26, thereby hiding the specific requirements of repository 4A from these modules.

In general, asset capture module 26 can augment the information extracted from repository 4A, and provides for resolution of conflicts between the extracted information and information required for publication of the asset by asset source 12A. Upon receiving notification 28 from asset source 12A indicating the availability of a new or updated asset, asset capture module 26 issues one or more messages 30 to asset source 12A to retrieve the asset. Messages 30 may comprise, for example, Simple Object Access Protocol (SOAP) messages, Remote Method Invocation (RMI) calls, or any other mechanism for communication between modules. In addition, asset capture module 26 may access asset library 36 to retrieve a current instance of the asset being produced by asset source 12A. Asset capture module 26 may present the current instance of the asset as well as the asset produced by asset 12A to users 8 for reconciliation.

Asset source 12A and asset capture module 26 make use of asset templates 47 to validate the asset information. In one embodiment, asset source 12A, or a schema generation module, generates a virtual schema in accordance by applying asset templates 47 to a base schema for an asset. Asset templates conform to a data description language, such as the extensible markup language (XML), and may include definition templates and constraint templates. The base schema conforms to a schema definition language, and defines a class of elements that conform to the data description language. In this manner, the base schema may remain static and need not be modified to support new classes of assets.

To define classes of permissible assets, a user, such as one of users 8 or library administrator 49, may create definition templates, constraint templates, or both. More specifically, the user may create one or more definition templates that define sub-classes for the elements defined by base schema. In this manner, the user can extend the element definitions of base schema without modifying base schema.

In addition, the user may create one or more constraint templates that define requirements for instances of the elements. Constraint templates may define requirements for instances of elements belonging to the classes defined by base schema, instances of elements belonging to the sub-classes defined by definition templates, or both. For example, constraint templates may define a required cardinality for the instances of the elements, a required minimum or maximum number of the instances, a range for a required number of the instances of the elements, a required attribute for the instances, a required parameter value for the instances of the elements, specific required instances of the elements, and the like.

Asset source 12A generates the schema information of virtual schema by first generating a data structure representing the classes of elements defined by base schema. Asset source 12A then applies definition templates to base schema to extend the schema information to include the sub-classes of elements defined within definition templates. Finally, Asset source 12A applies constraint templates to update the schema information to include the restrictions defined by constraint templates.

Definition templates and constraint templates conform to the data description language to which the elements of base schema comply, e.g., XML. Accordingly, the user can easily create and modify definition templates and constraint templates, and need only modify base schema in order to support new classes of assets.

Asset source 12A and asset capture module 26 may use asset templates 47 to drive the asset capture process. Based on the content and structure described by the asset schemas, which may be dynamically generated from asset templates 47, asset source 12A and asset capture module 26 identify any incomplete artifact data that needs to be added to the capture asset, either manually or in automated fashion. In this manner, asset source 12A can produce assets in a normalized form that complies with the schema information. The assets are normalized in the sense that the assets are described in a data description language, such as XML, and the elements and attributes are substantially similar.

The following pseudocode illustrates an exemplary base schema, definition template and constraint template that may be used for capturing information related to reusable software assets. In particular, the following exemplary base schema defines a parent class of elements named ASSET, and two child classes of elements named KEYWORD and RELATION.

```
<XSD:SCHEMA >
  <XSD:ELEMENT NAME="ASSET">
    <XSD:ELEMENT NAME="KEYWORD" MINOCCURS="0"
    MAXOCCURS="UNBOUNDED">
      <XSD:ATTRIBUTE NAME="NAME" TYPE="XSD:STRING"
      USE="REQUIRED "/>
      <XSD:ATTRIBUTE NAME="VALUE" TYPE="XSD:STRING"
      USE="REQUIRED"/>
    </XSD:ELEMENT>
    <XSD:ELEMENT NAME="RELATION" MINOCCURS="0"
    MAXOCCURS="UNBOUNDED">
      <XSD:ATTRIBUTE NAME="ROLE" TYPE="XSD:STRING"
      USE="REQUIRED"/>
      <XSD:ATTRIBUTE NAME="ID" TYPE="XSD:ID"
      USE="REQUIRED"/>
      <XSD:ATTRIBUTE NAME="TYPE" TYPE="XSD:STRING"
      USE="REQUIRED"/>
    </XSD:ELEMENT>
    <XSD:ATTRIBUTE NAME="NAME" TYPE="XSD:STRING"
    USE="REQUIRED"/>
    <XSD:ATTRIBUTE NAME="TEMPLATE" TYPE="XSD:STRING"
    USE="REQUIRED"/>
  </XSD:ELEMENT>
</XSD:SCHEMA>
```

The following exemplary definition template illustrates the definition of sub-classes for the classes of elements KEYWORD and RELATION, thereby extending the definitions provided by the above-listed exemplary base schema.

```
<TEMPLATE NAME="ASSET-DEFINITION-TEMPLATE"
PARENT="ASSET-SCHEMA.XSD">
  <DEFINE-KEYWORD NAME="CATEGORY" TYPE="STRING">
    <ADD-VALUE VALUE="FINANCE"/>
    <ADD-VALUE VALUE="BANKING"/>
  </DEFINE-KEYWORD>
  <DEFINE-KEYWORD NAME="PRICE" TYPE="DECIMAL"/>
  <DEFINE-KEYWORD NAME="ALIAS" TYPE="STRING"/>
  <DEFINE-RELATION ROLE="USES" TYPE="ASSOCIATION"/>
  <DEFINE-RELATION ROLE="PREDECESSOR"
  TYPE="PREVIOUS-VERSION">
    <MAX-OCCURS VALUE="1"/>
  </DEFINE-RELATION>
</TEMPLATE>
```

The above-illustrated exemplary definition template makes use of elements DEFINE-KEYWORD and DEFINE-RELATION to define specific sub-classes for these respective classes of elements defined by the exemplary base schema. More specifically, for class KEYWORD, the exemplary definition template defines a sub-class CATEGORY having two possible values: FINANCE and BANKING. The exemplary definition template defines two additional sub-classes for the class KEYWORD including PRICE and ALIAS. For the class RELATION, the definition template defines two sub-classes of USES and PREDECESSOR.

The following exemplary constraint template provides requirements for the use of, and constraints for, the instances of the elements.

```
<TEMPLATE NAME="ASSET-CONSTRAINT-TEMPLATE"
PARENT="ASSET-DEFINITION-TEMPLATE.XML">
  <USE-KEYWORD NAME="CATEGORY"/>
  <USE-KEYWORD NAME="PRICE">
    <MAX-OCCURS VALUE="1"/>
  </USE-KEYWORD>
  <USE-RELATION ROLE="PREDECESSOR"/>
  <USE-RELATION ROLE="USES">
    <MIN-OCCURS VALUE="1"/>
  </USE-RELATION>
</TEMPLATE>
```

The above-illustrated exemplary constraint template makes use of elements USE-KEYWORD and USE-RELATION to define specific requirements for instances for the sub-classes of elements defined by the definition template. More specifically, the exemplary constraint template allows at least one instance of an element belonging to the sub-class CATEGORY. The exemplary constraint template further allows at most one instance of an element belonging to the sub-class PRICE. Similarly, the exemplary constraint template allows at least one instance of an element belonging to the sub-class PREDECESSOR, and requires at least one instance of an element belonging to the sub-class USES.

The following pseudocode illustrates an exemplary document that describes a reusable software asset, and which complies with the exemplary base schema, definition template, and constraint template listed above.

```
<ASSET NAME="BANKING-ASSET-2.0"
TEMPLATE="ASSET-CONSTRAINT-TEMPLATE.XML">
  <KEYWORD NAME="CATEGORY" VALUE="BANKING"/>
  <KEYWORD NAME="PRICE" VALUE="100.00"/>
  <RELATION ROLE="USES" ID="CURRENCY-ASSET-4.1"
  TYPE="ASSOCIATION"/>
  <RELATION ROLE="PREDECESSOR"
  ID="BANKING-ASSET-1.0" TYPE="PREVIOUS-VERSION"/>
</ASSET>
```

The form of asset capture module 26 may vary depending on whether asset management system 6 is configured for manual, semi-automated, or automated asset capture. Asset capture module 26 may comprise, for example, editing tools by which a user 39 can manually supply information to complete or augment the information captured from repository 4A. In addition, the user may interact with the editing tools to resolve any conflicts between the extracted asset information and the required information. For semi-automated or automated environments, asset capture module 26 may invoke one or more scripts to automate the augmentation of information with the asset information extracted by asset source 20. Asset capture module 26 may be embedded within asset management system 6 as illustrated, or remotely connected to the asset management system 6.

In some fully automated environments, asset source 12A may bypass asset capture module 26 by withholding notification 28, and may issue notification 32 to publishing module 24 indicating that the asset is ready for publishing to asset library 36. In fully automated environments, asset source 12A validates the asset information using asset templates 47.

Upon receiving notification 32, publishing module 24 issues messages 34 to asset source 12A to retrieve the normalized asset from asset source 12A. Upon retrieving the normalized asset, publishing module 24 stores the asset within asset library 36.

Asset management system 6 may further include a modeling module 38 that allows users 8 to develop models 37 having one or more elements that represent functionality of interest to the enterprise. For example, user 8 may interact with modeling module 38 to develop models 37 that may include process models, structural models, resource models, implementation models, and the like, for a software development project. Modeling module 38 may comprise an integrated proprietary modeling tool, or any conventional modeling tool capable of producing modeling information, such as Rational Rose™ from the Rational Software Corporation of Cupertino, Calif., or combinations of both such tools.

Asset retrieval module 42 allows users 8 to access and manage asset data within asset library 36. In particular, asset retrieval module 42 allows one or more users 8 to develop model-driven search specifications (search specs) 48. In other words, asset retrieval module 42 allows users 8 to select elements from one or more of models 37 to build search specifications 48. Scoring engine 44 scores each asset published by publishing module 24 against search specifications 48 to aid in identifying the most relevant assets within asset library 36. In this manner, users 8 can selectively retrieve assets from asset library 36 using modeling data from models 37 to guide the search process. Asset library 36 may be implemented as any data source, such as a relational database management system (RDBMS), an object-oriented database, flat files, and the like.

Library administration (admin) module 46 provides an interface by which library administrator 49 can manage asset library 36. For example, library administrator 49 may define rules that control the development of search specifications 48. In addition, library administrator 49 may edit asset templates 47 to define new asset types or update the schemas for existing asset types.

Figure 3:
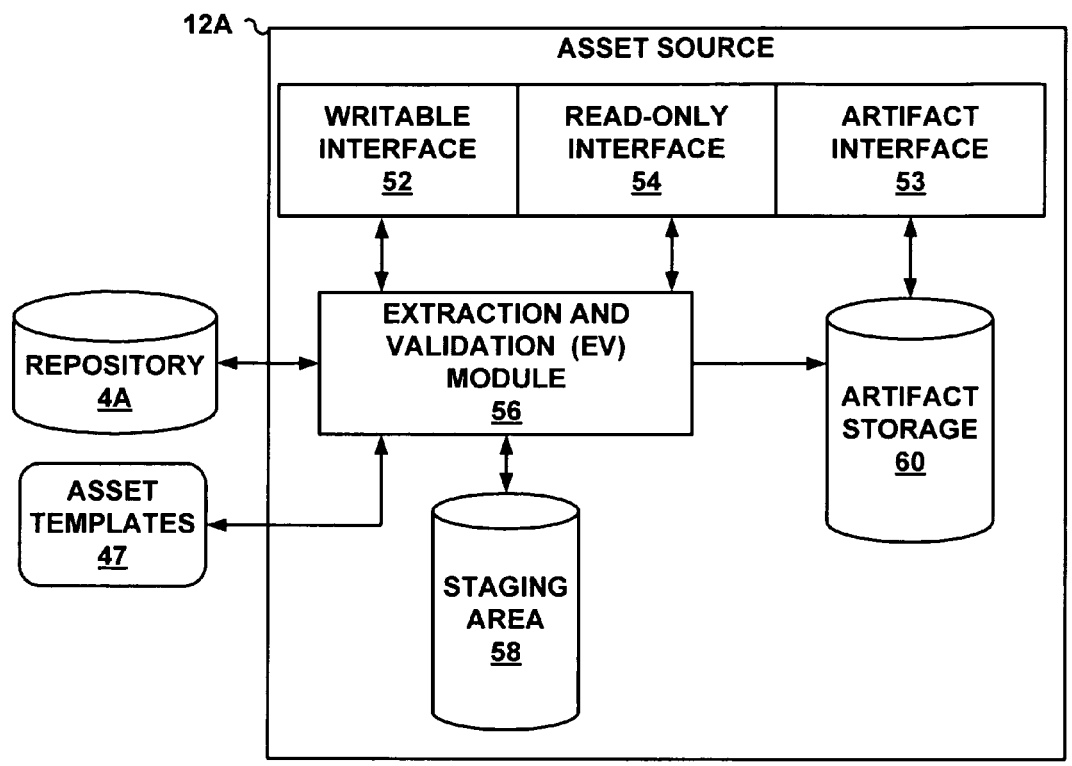
FIG. 3 is a block diagram illustrating an example embodiment of an asset source.

FIG. 3 is a block diagram illustrating an example embodiment of asset source 12A. Extraction and validation (EV) module 56 provides the core logic of asset source 12A, and may include one or more software components. EV module 56 monitors repository 4A, or receives notifications from repository 4A, to identify any new or updated artifacts. Upon identifying any such artifact, EV module 56 generates an asset having metadata and data that may include or reference the new or updated artifact. EV module 56 caches an instance of the asset within staging area 58. EV module 56 validates the asset using asset templates 47 to identify whether the asset is ready for publishing, or perhaps requires reconciliation or further artifact data.

More specifically, EV module 56 generates the assets in a form compliant with a data description language, and may include metadata as well as actual artifact data, or references to artifacts stored within either repository 4A or artifact storage 60. Asset source 12A manages artifact storage 60 to store artifact data retrieved from repository 4A as needed, and provides artifact interface 53 for external access. Accordingly, upon publication to asset library 36 (FIG. 2), the stored assets may comprise metadata, artifact data, references to artifact data within artifact storage 60 of one or more asset sources 12 or a central artifact storage, or any combination thereof.

Asset source 12A includes a read-only interface 54 for use by publishing module 24 (FIG. 2) for extracting assets in a normalized form compliant with a data description language. In other words, publishing module 24 invokes read-only interface 54 to direct EV module 56 extract one or more asset from staging area 58. Upon receiving the assets from staging area 58 via read-only interface 54, publishing module 24 stores the assets within asset library 36.

In addition, asset source 12A may include a writable interface 52 that allows asset capture module 26 to augment the artifact information of the underlying repository 4A or artifact storage 60. Asset capture module 26 invokes read-only interface 54 to direct EV module 56 to extract one or more asset from staging area 58. Upon receiving the assets from staging area 58 via read-only interface 54, asset capture module 26 augments the artifact data via writable interface 52 using manual, semi-automated, or automated techniques, as described herein.

The following code illustrates exemplary embodiments for interfaces 52, 53, and 54, that may be provided by asset source 50.

```
/***** Artifact Repository Interface *****/
interface ArtifactRepository {
/* Get the installation unique ID of this ArtifactRepository */
public abstract String getId( );
/* Retrieve the specified artifact from the repository. */
ArtifactStream getArtifact(String assetId, String artifactId);
}
/***** Writable Interface for Artifact Repositiory ***** /
interface WriteableArtifactRepository extends ArtifactRepository {
/* Store the given artifact in the repository */
void storeArtifact(String assetId, String artifactId);
/** Remove the specified artifact from the repository */
void removeArtifact(String assetId, String artifactId);
}
/***** Read-only Interface for Asset Source *****/
interface AssetSource extends AssetRepository {
/* Get the installation unique ID of this AssetSource */
public abstract String getId( );
/* Get the XML representation of the specified asset. */
public abstract String getAsset(String assetId);
/* Get all publish-ready assets available from this AssetSource.
Returns a collection of Strings that are the XML
representation of the assets */
public abstract Collection getAssets( );
/* This method is used as a callback from the "consumer"
of this AssetSource, such as the publishing module, to
indicate that it is now using the asset and that the AssetSource
should not allow changes to the visble artifacts of the asset. */
public abstract void publishAsset(String assetId);
/* This method may be used to give the AssetSource an XML
structure consisting of a list of classifier criteria which is then
used by the AssetSource to expose only those assets from its
underlying sources that meet the given criteria. * /
public abstract void setFilter(String classificationCriteria)
/* Register the given consumer, such as the asset capture
module or the publishing module, for notification of new assets
or changes to existing assets. */
public abstract void registerConsumer(AssetSourceConsumer consumer);
}
/***** Writeable Interface for Asset Source *****/
interface WriteableAssetSource extends AssetSource,
WriteableArtifactRepository {
/* Create a new asset into the asset source (used by the asset
capture module to create new assets either from scratch or
from existing XML asset documents. */
public abstract void createAsset(String assetXMLDoc);
/** Update an existing Asset in the repository. */
public abstract void updateAsset(String assetXMLDoc);
```

```
/* Remove an Asset from the repository */
public abstract void removeAsset(String assetId);
}
```

Figure 4:
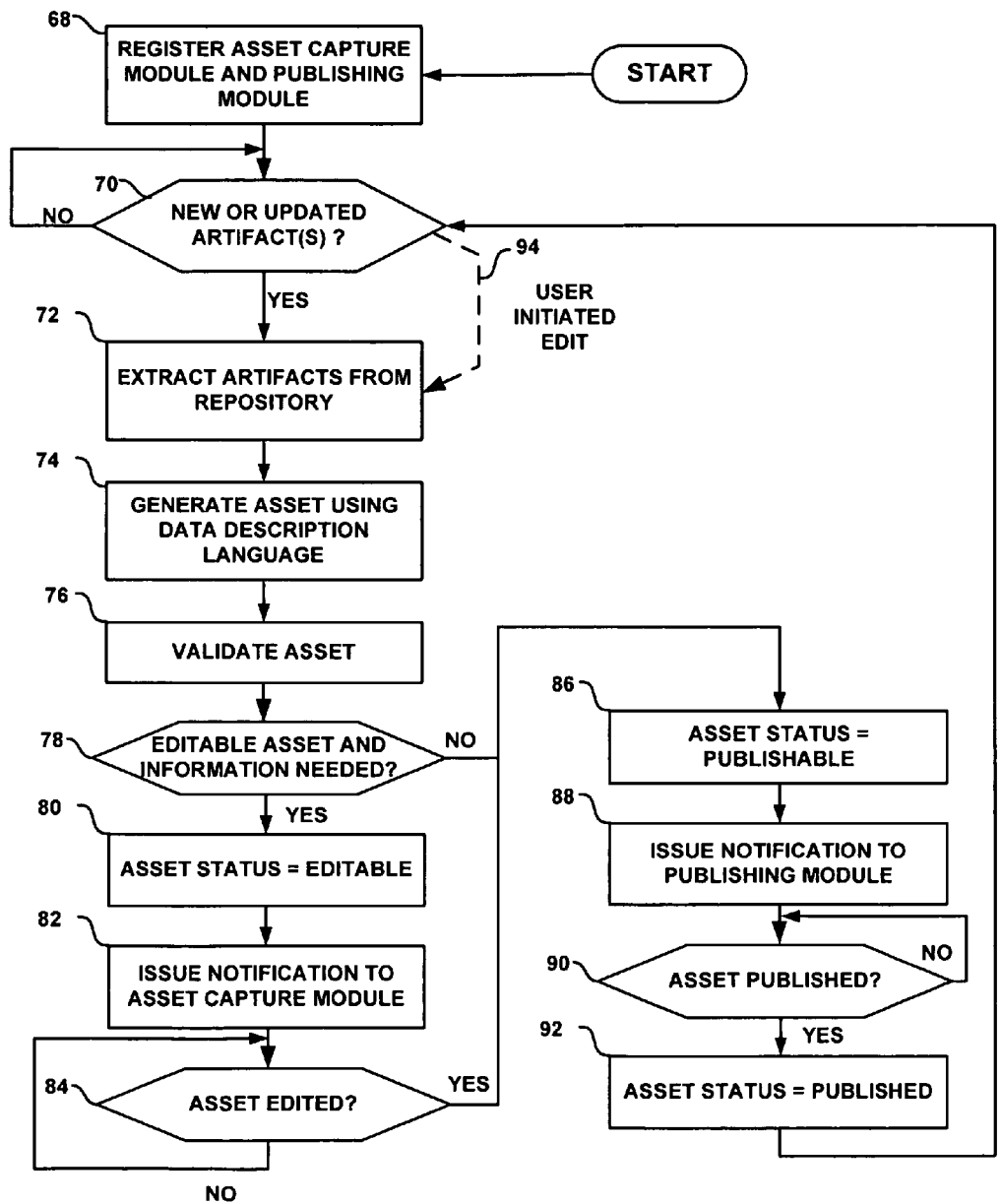
FIG. 4 is a flowchart illustrating in further detail the interactions between the asset management system and the asset sources to facilitate the reuse of assets within an enterprise.

FIG. 4 is a flowchart illustrating in further detail the interactions between an example asset management system 6 (FIG. 1) and asset sources 12 to facilitate the reuse of assets within an enterprise. Initially, publishing module 24 (FIG. 2) and asset capture module 26 of asset management system 6 register with each of asset sources 12 as potential "consumers" of assets (68). During the registration, each of publishing module 24 and asset capture module 26 may communicate a unique communication handle, such as a port number, socket handle, callback pointer, and the like, which asset sources 12 use to communicate with the modules. In particular, asset sources 12 may use the communication handles to notify publishing module 24 and asset capture module 26 of new or updated assets.

When asset sources 12 detect new or updated artifacts within repositories 4 (70), the asset sources 12 extract the information from repositories 4 (72). Asset source 12A, for example, may extract new or updated artifact information stored within repository 4A. For exemplary purposes, the remainder of FIG. 4 is described in reference to asset source 12A and repository 4A.

After extracting the artifact information, asset source 12A, generates the asset based on the extracted artifact information in a form that complies with a data description language, such as XML, and stores the asset within staging area 58 (74). Asset source 12A selects one or more asset templates 47 that provide an asset schema for controlling the generation. During this process, asset source 12A validates the generated asset to determine whether any additional information is needed to augment or reconcile the artifact information (76).

If, based on the validation, additional information is need to augment or reconcile the artifact information, asset source 12A determines whether the asset is an editable asset, possibly based on configuration information or the asset schema provided by asset templates 47 (78). If so, asset source 12A sets a status of the asset as "editable" (80), and issues notification 28 to asset capture module 26 to indicate that an editable asset is available within staging area 58 (82).

In response, asset capture module 26 provides the required information, possibly in a manual, semi-automated, or fully-automated manner (84). In addition, asset capture module 26 may assist users 8 in reconciling the instance of the asset stored within staging area 58 with a current version of the asset that may be stored within asset library 36. Upon completion of the editing process by asset capture module 26, asset source 12A changes the status of the asset within staging area 58 from "editable" to "publishable" (86). Similarly, if the asset was non-editable, or if additional information was not needed (no branch of 78), asset source 12A bypasses asset capture module 26 and marks the asset as "publishable" (86).

Next, asset source 12A issues notification 32 to publishing module 24 that an asset within staging area 58 is ready for publishing (88). Finally, publishing module 24 retrieves the asset from asset source 12A (90), and publishes the asset to asset library 36, possibly in a manual, semi-automated, or fully-automated manner, thereby making the asset available to users 8 via asset retrieval module 42. Asset source 12A sets the status of the asset within the staging area as "published" (90), and repeats the process for subsequent new or updated asset artifacts.

The update and publication process described above need not be triggered by the detection of new or updated artifact information within a repository. User 8 may, for example, trigger the process by selecting an asset within asset library 36, and initiating an update process (as indicated by dashed line 94). In particular, asset capture module 26 may reconcile the instance of the asset generated by asset module 12A with a current version of the asset stored within asset library 36. User 8 may also initiate the creation of a new asset through this process by selecting one or more template(s) and proceed edit the newly created asset according to the templates.

Figure 5:
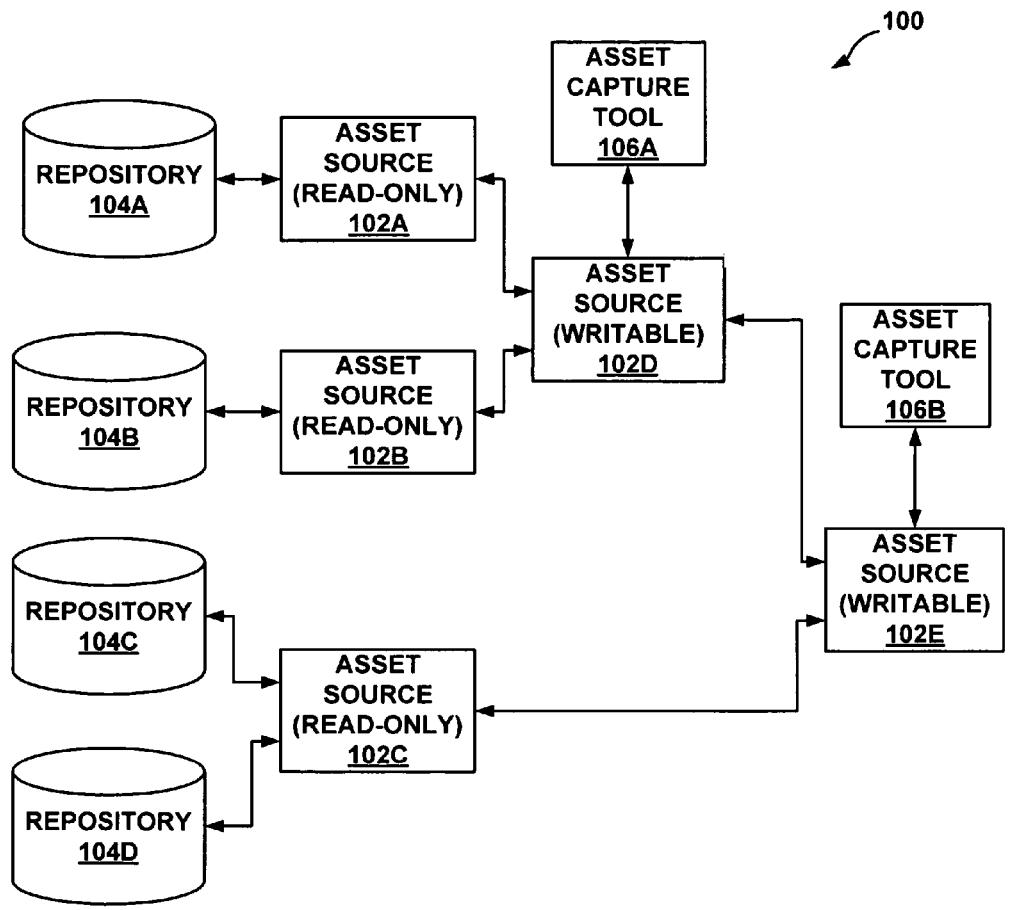
FIG. 5 is a block diagram illustrating an asset source hierarchy.

FIG. 5 is a block diagram illustrating exemplary an asset source hierarchy 100 in which asset sources 102A-102E (herein asset sources 102) are coupled to repositories 104A-D. As illustrated, asset sources 102 need not have a one-to-one relationship with repositories 104, and may be hierarchically arranged to provide multiple abstract levels as assets are captured and published. Hierarchy 100 is illustrated for exemplary purposes. Accordingly, asset sources 102 may be hierarchically arranged as required to capture assets from a wide-variety of environments.

For example, asset sources 102A-102C are coupled to repositories 104, and form a first layer of asset source hierarchy 100. More specifically, asset source 102A is configured to generate assets based on artifacts stored within repository 104A. Similarly, asset source 102B is configured to generate assets based on artifacts stored within repository 104B. Asset source 102C is configured to generate assets based on artifacts stored within repository 104C and repository 104D. In other words, asset source 102C monitors both repository 104C and repository 104D, and generates assets based on new or updated artifacts.

In the illustrated example hierarchy 100, asset sources 102A-102C comprise read-only asset sources, and publish assets to upper levels of asset source hierarchy 100 without invoking a capture tool. Accordingly, asset sources 102A-102C need not support writeable interfaces.

Asset source 102D receives and aggregates assets from asset sources 102A, 102B. In particular, asset source 102D may receive incomplete assets from asset sources 102A, 102B, and may combine the artifacts, or references thereto, of the received assets to form aggregate assets. Asset source 102D may invoke asset capture tool 106A to augment or reconcile the aggregate assets.

Similarly, asset source 102E receives and aggregates assets from asset sources 102C, 102D, and may invoke asset capture tool 106B to augment or reconcile the aggregate assets. Accordingly, the aggregate assets produced by asset source 102E should be complete, and in a state for publishing to asset library 36. Alternatively, asset sources 102D, 102E, for example, may treat assets from each of sources 102A, 102B, 102C as independent assets for publishing to asset library 36.

Figure 6:
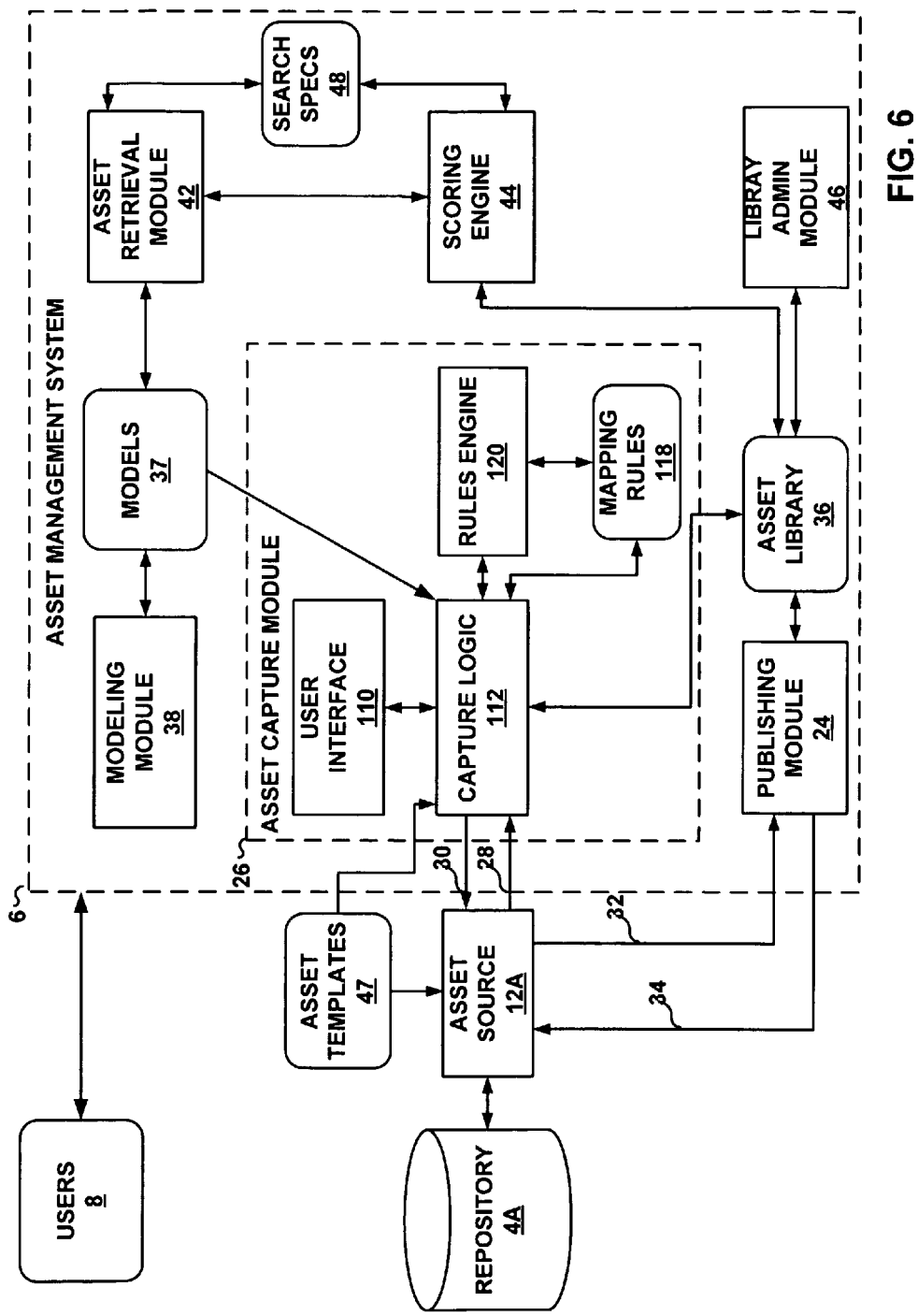
FIG. 6 is a block diagram illustrating in further detail one embodiment of an asset capture module of the asset management system

FIG. 6 is a block diagram illustrating in further detail one embodiment of asset capture module 26 of asset management system 6. For manual or semi-automated generation of assets, users 8 interact with user interface 110 to provide additional asset information, or reconcile the current artifacts captured by asset source 12A from repository 4A. Capture logic 112 drives user interface 110 to interact with users 8 according to asset schemas defined by asset templates 47. In this manner, asset capture module 26 offers users 8 and library administrator 48 (FIG. 2) the flexibility of changing asset capture workflow, as well as the structure and content of the captured assets, by changing asset templates 47.

During the process, capture logic 112 maps the artifacts of the asset produced by asset source 12A to searchable elements of models 37. In particular, capture logic 112 makes use of rules engine 120 to map the metadata and artifact data of the generated assets to elements of models 37. During the asset generation process, capture logic 112 allows users 8 or a library administrator 48 (FIG. 2) to dynamically define and modify mapping rules 118 to customize the mapping process. In one embodiment, rules engine 120 may comprise a Java-based rules engine, such as JRules™ from ILOG Incorporated of Paris, France. Other embodiments may implement the mapping process through other techniques, e.g., hard-coded procedural logic.

Figure 7:
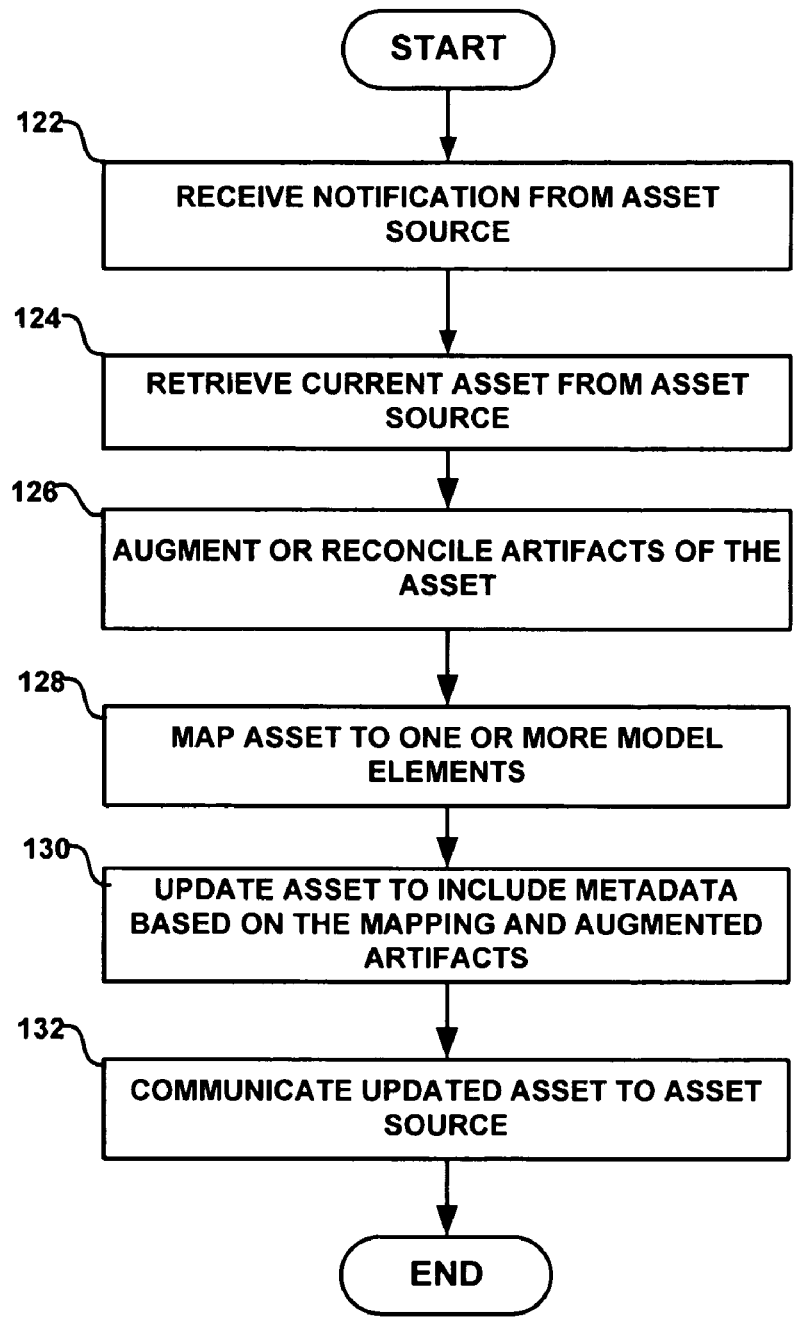
FIG. 7 is a flowchart further illustrating an example mode of operation of the asset capture module.

FIG. 7 is a flowchart further illustrating an example mode of operation of asset capture module 26. Initially, capture logic 112 receives notification 28 from asset source 12A indicating an asset within staging area 58 has been generated and is ready for editing (122). In response, capture logic 112 retrieves the current asset from asset source 12A (124), and augments or reconciles the artifacts of the current asset (126). Based on asset templates 47, as described above, capture logic 112 may drive user interface 110 to capture the required information from users 8. Alternatively, capture logic 112 may invoke one or more scripts or other components to automate the process.

Next, capture logic 112 maps the asset to one or more model elements of models 37 (128). Capture logic 112 may, for example, invoke rules engine 120 to perform the mapping based on mapping rules 118. In addition, capture logic 112 may drive user interface 110 to map the assets to model elements based on input from users 8. In this manner, capture logic 112 builds associations between generated assets and the elements of models 37. Assets may be associated with, for example, interfaces, components, functions, case steps, and other elements that may be described within models 37.

Next, capture logic 112 updates the asset to include additional metadata based on the developed mapping, as well as any additional artifacts and other metadata that may have been provided by users 8 or automated scripts (130). Finally, capture logic 112 communicates the updated asset to asset source 12A for storage in staging area 58 (132).

Figure 8:
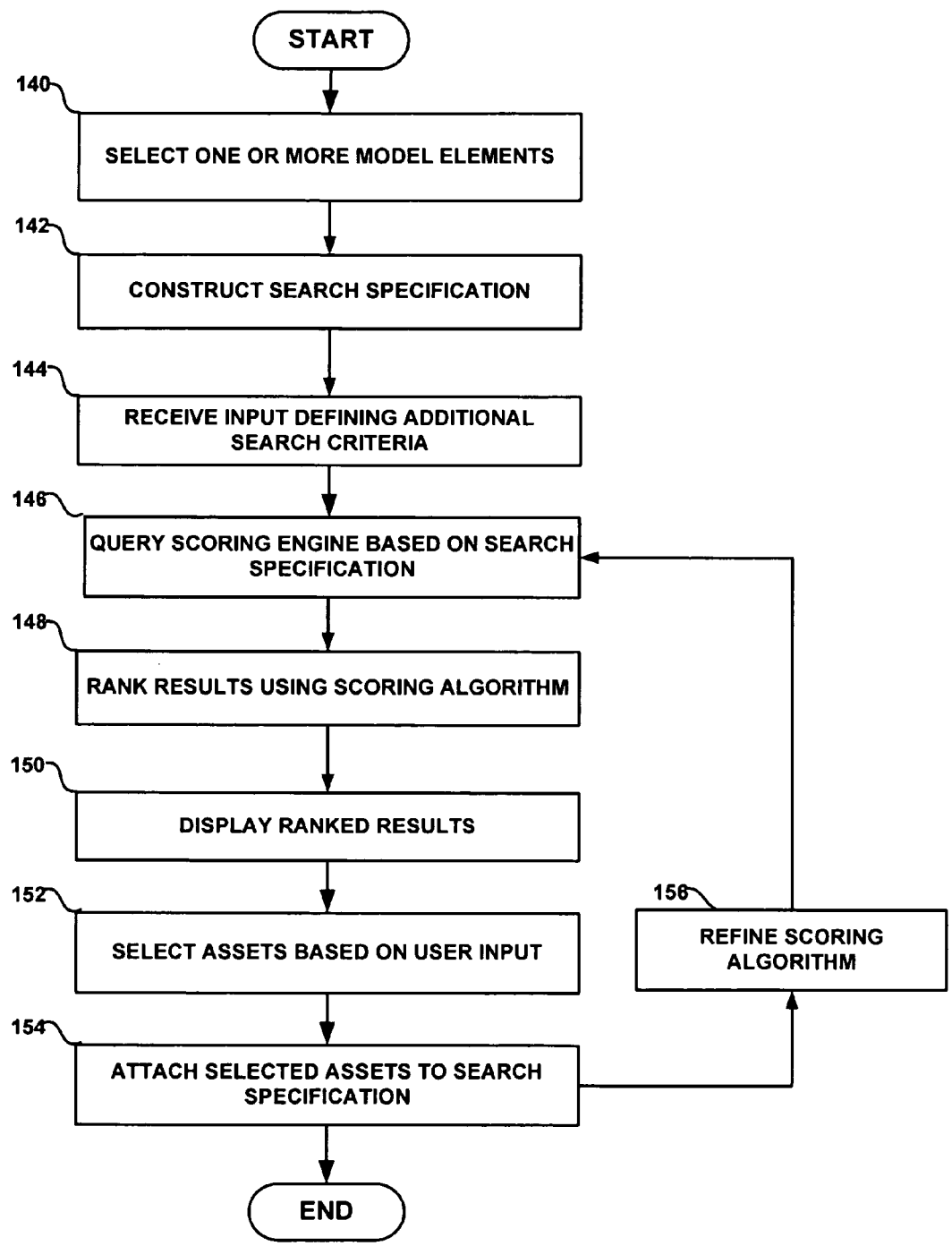
FIG. 8 is a flowchart illustrating an example of retrieving reusable assets from the asset management system.

FIG. 8 is a flowchart illustrating an example operation of retrieving reusable assets from asset management system 6. Based on input from one of users 8, asset retrieval module 42 selects one or more elements of models 37 (140) and constructs a model-based search specification 48 (142). The user may, for example, graphically view one or more of models 37, and identify elements, such as interfaces, components, functions, case steps, and the like, for inclusion within the search specification. In addition, asset retrieval module 42 may receive additional search criteria, such as keywords and other classifiers including an operating system, license type or language, for inclusion within the search specification 48 (144).

Next, asset retrieval module 42 directs scoring engine 44 to search asset library 36 in accordance with the search specification 48 (146). Based on the search specification, scoring engine 44 ranks the assets within asset library 36 using a scoring algorithm that determines, for example, how closely each asset satisfies the criteria of the search specification 48 (148).

Asset retrieval module 42 displays to the user the ranked assets found within asset library 36 by scoring engine 44 (150), and selects one or more of the assets in response to user input (152). Based on user request, asset retrieval module 42 attaches the selected assets to the search specification 48 (154). In this fashion, the user can selectively retain the assets for a software project. In one embodiment, scoring engine adaptively updates the search specification 48 based on the assets attached by the user, thereby dynamically refining scoring algorithm (156).

Figure 9:
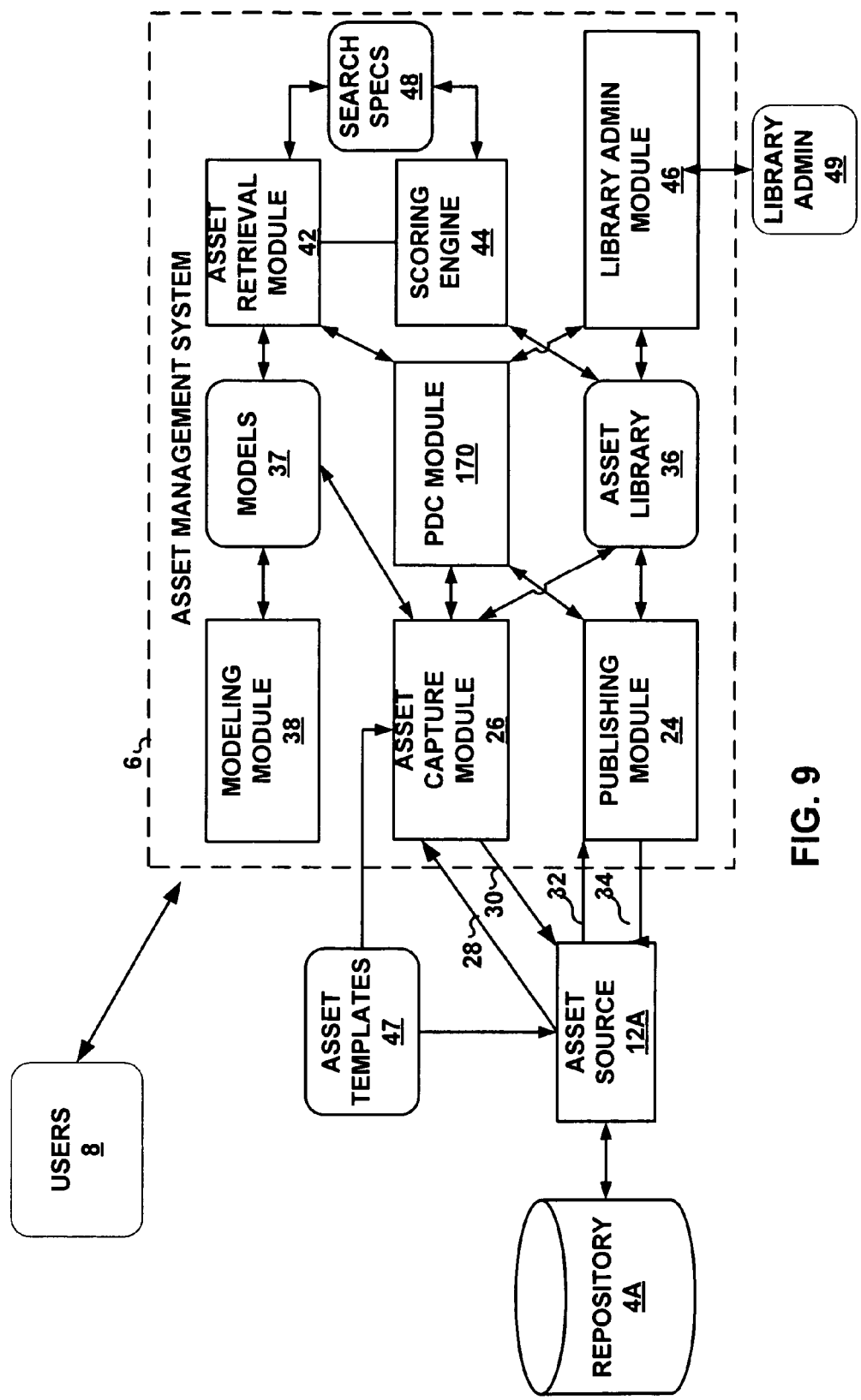
FIG. 9 is a block diagram illustrating an example embodiment in which a production and deployment control (PDC) module facilitates customizable procedures for managing behavior of an asset management system.

FIG. 9 is a block diagram illustrating an alternative embodiment in which asset management system 6 includes a Production and Deployment Control ("PDC") module 170. PDC module 170 performs a production and deployment control process each time asset management system 6 receives an external event or generates an internal event. For example, an external event might occur when user 8 manually submits an asset to be included in asset library 36 or when asset capture module 26 discovers a new asset. The production and deployment control process governs how asset management system 6 handles the event.

By customizing the production and deployment control process, library administrator 49 can manage the behavior of asset management system 6. For instance, library administrator 49 can utilize PDC module 170 to define asset management validations, processes and roles, which asset management system 6 then automates. For simple deployments, automation can occur entirely within asset management system 6. For more sophisticated uses, library administrator 49 can program PDC module 170 to exploit external tools, workflows (both manual and automated) and other mechanisms.

As illustrated in FIG. 9, PDC module 170 communicates with several other components of asset management system 6. For example, PDC module 170 communicates with library administration module 46 to receive input from library administrator 49. In addition, PDC module 170 interacts with asset capture module 26 in a variety of ways. For instance, PDC module 170 may instruct asset capture module 26 to automatically validate one or more asset artifacts gathered during the asset capture process, or to delay completion of the asset capture process (i.e., step 88 of FIG. 4) until a supervisor approves inclusion of the asset. Similarly, PDC module 170 may communicate with publishing module 24 to prevent publication unless some event occurs. Finally, PDC module 170 may interact with asset retrieval module 42 to prescribe a production and deployment control process that must occur before user 8 retrieves an asset from asset library 36. In this way, library administrator 49 could automate a procedure for requesting permission to view assets.

In this manner, PDC module 170 allows users to easily customize asset governance processes and extend the standard behavior of asset management system 6 through an event driven extension mechanism. As described further below, this customization can be managed through a document known as a Library Process Configuration (LPC) document that defines the structure of the event-driven processes and additionally defines extended functionality that has been "plugged-in" to asset management system 6. To process the LPC document, PDC module 170 may read the LPC document, parse task specifications from the LPC document, and parse task preconditions from the LPC document. For instance, PDC module 170 may allow customers to define "Listeners" that encapsulate custom behavior and specify the events and conditions that will cause this behavior to be invoked. The LPC document is in a format that complies with a data description language such as extensible markup language (XML).

Figure 10:
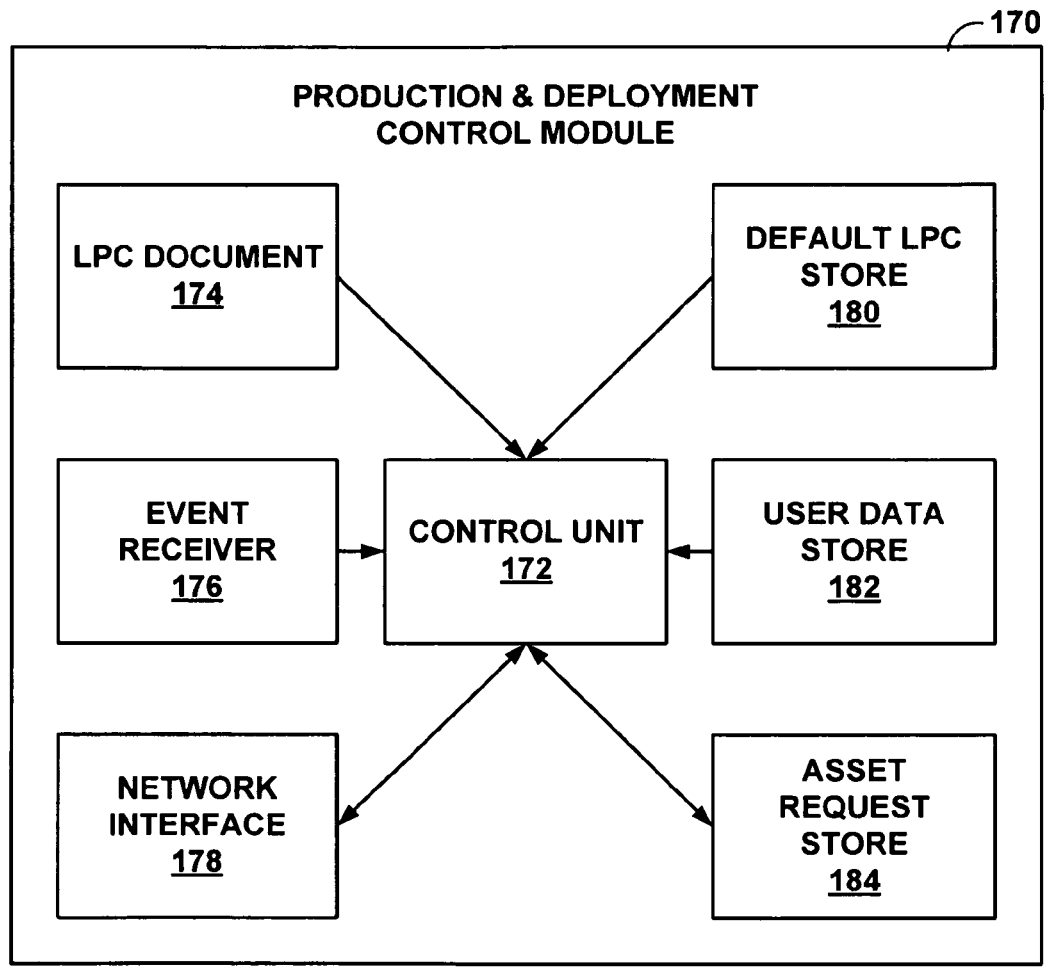
FIG. 10 is a block diagram illustrating an embodiment of the production and deployment control module in greater detail.

FIG. 10 is a block diagram illustrating an example embodiment of PDC module 170 in greater detail. In this example, PDC module 170 consists of several components. Foremost among these items is a control unit 172. Control unit 172 may represent a software module capable of interpreting XML documents, receiving events from an event receiver 176, receiving input from a network interface 178, and performing input/output operations on an asset request store 184.

In order to define a production and deployment control process, library administrator 49 can define sets of events, filters, listeners, actions, groups, and process integration points. PDC module 170 stores these sets in Library Process Configuration ("LPC") document 174. In addition to the sets defined by library administrator 49, PDC module 170 supplies various default events, listeners, actions, roles, groups, and process integration points in a default LPC store 180. PDC module 170 may store LPC document 174 in XML format.

Events represent the occurrence of a change of state within asset management system 6. This change of state may be the result of an automatic or user driven process. PDC module 170 pre-defines a set of events for known significant changes. Typically, pre-defined events contain context information in attributes or properties of the event. In addition to pre-defined events, PDC module 170 also supports custom events introduced in LPC document 174. Each kind of event may be uniquely identified by its "event type" and may be additionally classified by the following attributes:

Category—a grouping for similar events.
Component—the component associated with the event. (E.g., "ASSETSOURCE" or "LIBRARY")
Severity—Used to distinguish between events representing messages, warnings or errors.
Asset ID—the id of the asset associated with this event.
Group Name—the name of the organizational group associated with this event.
User ID—the account name of the user associated with this event.

Events may be generated explicitly through a notifyListeners( ) method on the LibraryAPI SOAP interface. The execution of a listener may also create an event.

Filters encapsulate filtration criteria that control module 172 applies to an event or set of events. Filters allow more precise triggering of listener behavior than simple events. For example, library administrator 49 (FIG. 9) can program a filter to trigger an action when any one of a set of specified events have occurred. In addition, library administrator 49 may also specify one or more classification criteria sets, each of which supply a set of conditions that must occur before PDC module 170 notifies a listener. PDC module 170 stores specific classification criteria sets in user data 182. Using a classification criteria set permits library administrator 49 to select the precise conditions under which control unit 172 invokes a listener. Filters also allow library administrator 49 to add event severities, categories, user IDs, asset IDs, and Group names to the filtration criteria. For example, library administrator 49 might include the following XML code in LPC document 174:

```
<filter name="WebServiceArtifactUpdates">
    <event>ARTIFACT_CREATED</event>
    <event>ARTIFACT_UPDATED</event>
    <classification-criteria-sets>
        <classification-criteria-set-name>
        WebserviceAssets
        </classification-criteria-set-name>
    </classification-criteria-sets>
</filter>
```

This code creates a filter that triggers a listener only when either the ARTIFACT_CREATED and ARTIFACT_UPDATES events have occurred and the conditions of the "WebserviceAssets" Classification Criteria Set have been fulfilled.

Library administrator 49 may also select the compliment of the specified Classification Criteria Sets in a filter by specifying the Boolean attribute "complement" as "true". This allows all events pertaining to assets that do not match the specified Classification Criteria Sets. For example,

```
<classification-criteria-sets complement="true">
    <classification-criteria-set-name>
        DatabaseApplicableAssets</classification-criteria-set-name>
</classification-criteria-sets>
```

When an event occurs or the conditions of a filter are met, control module 172 checks a set of actions to see whether all of the preconditions for an action are fulfilled. When all of the preconditions of a filter are met, control unit 172 invokes the listener or listeners associated with the action. In addition, an action may define one or more result events. Control module 172 releases such result events when control module 172 completes the execution of the specified listener or listeners.

Actions take a list of one or more trigger events (events or filters). By default, if any event matching the list of specified events or filters occurs, control unit 172 invokes the specified listener. Alternatively, if library administrator 49 uses the "SYNCHRONIZED" flag, control unit 172 only invokes the listener when all specified trigger-events (events or filters) have occurred.

Library administrator 49 may associate a result event with a listener return value (a "result-condition"). Doing so instructs control unit 172 to trigger different events based on the success or failure of the listener's processing. If the action does not specify a listener, but does specify a result event, control unit 172 simply raises the specified result event. In effect, such an action converts the trigger events or filters into the result event. Under such circumstances, control unit 172 passes the attributes and properties of the triggering event to the result events.

The following exemplary XML code defines an action. Specifically, when the ASSET_SUBMIT event occurs, control unit 172 invokes the "WSDLValidator" listener. When control unit 172 has finished processing the "WSDLValidator" listener, this code causes control unit 172 to raise the ASSET_PUBLISH_READY event and sets the result-condition to 0.

```
<action>
    <trigger-event>
        <event>ASSET_SUBMIT</event>
    </trigger-event>
    <listener>WSDLValidator</listener>
    <result-event>
        <event>ASSETPUBLISH_READY</event>
        <result-condition>0</result-condition>
    </result-event>
</action>
```

Listeners define the substantive behavior of a task that PDC module 170 undertakes. Specifically, a listener provides a reference to a class or service that encapsulates custom behavior of the asset management system. Library administrator 49 defines listeners using a "listener" element within the "listeners" section of LPC document 174. Library administrator 49 must give each listener a unique name within LPC document 174. Library administrator 49 must also associate each listener must with a listener class. The listener class is name of the actual implementation of the listener.

A listener definition may also include the properties used by control unit 172 to configure the listener class instance. The following is an example of a listener definition that defines a listener named "WSDLValidator" that uses the listener class "XMLArtifactValidator". In practice, the WSDLValidator listener could describe a method that validates Web Service Description Language (WSDL) files. (WSDL files are encoded in XML.) A value is specified for the property "target-artifact-category" that is used to configure the listener instance.

```
<listener name="WSDLValidator" class="XMLArtifactValidator">
    <properties>
        <propertyname="target-artifact-category" value="wsd1" />
    </properties>
</listener>
```

PDC module 170 supports both internal and external listeners. PDC module 170 provides a library of internal listener classes to perform such tasks as Universal Description, Discovery, and Integration (UDDI) publishing and XML validation. For instance, in the example used above, "XMLArtifactValidator" was an internal listener.

External listeners are listeners provided by library administrator 49 rather than PDC module 170. In particular, external listeners are web services that implement an ExternalListener service interface definition. Library administrator 49 may define an external listener in a similar fashion in LPC document 174 as an internal listener. However, in this exemplary embodiment, the "class" attribute is set to "ExternalSOAPListener". The properties for an external listener may include the URL of a web service implementing the ExternalListener interface, and optionally a user ID and password to use for basic hyper-text transfer protocol (HTTP) authentication to the web service. PDC module 170 may use additional properties to the external listener service and used for configuration specific to that listener implementation. Thus, when PDC module 170 invokes an external listener, PDC module 170 transfers properties specified in LPC document 174 to the implementation of the external listener. In some circumstances, PDC module 170 may transmit a request that includes the properties to a web service on a remote system through network interface 178 that processes the external listener implementation. Subsequently, PDC module 170 may receive a result from the listener implementation.

The following is an example of an external listener definition:

```
<listener name="MyExternalListener" class="ExternalSOAPListener">
    <properties>
        <property name="accesspoint_url"
            value="http://myserver/services/ExternalListenerSoap" />
        <property name="auth_userid" value="admin" />
        <property name="auth_password" value="xyz123" />
        <property name="my_property" value="foo" />
    </properties>
</listener>
```

PDC module 170 allows library administrator 49 to define custom roles for users and groups. These custom roles may supplement the any standard roles included in default LPD store 180. Custom roles allow library administrator 49 to define which users are to be involved in a particular library process. For example, library administrator 49 can specify a custom role such that a representative from the performance team that must approve assets prior to their publication. Like events, filters, and listeners, library administrator 49 defines custom group roles in the "group-roles" element in LPC document 174. Defining a group-role in LPC 174 document makes the group role available in the list of roles to assign to a user through the interface of library administration module 46.

The following example defines three group roles:

```
<group-roles>
    <group-role>PerformanceRep</group-role>
    <group-role>SecurityArchitect<igroup-role>
    <group-role>DatabaseArchitect</group-role>
</group-roles>
```

In addition to the groups defined by library administrator 49 in LPC document 174, default LPC store 180 contains pre-defined group roles. For instance, default LPC store 180 may contain groups such as "Project Manager", "ACE", "Publisher", and "Asset Owner".

Like the conditions associated with filters, library administrator 49 can define the complement of the set of specified groups by using the "complement" attribute on the "groups" sub-element. For example, by using the "complement" attribute, library administrator 49 could make an event apply to all users 8 who are not members of the specified groups. The following XML code allows events for all groups except "group1" and "group2".

```
<groups complement="true">
    <group-name>group1</group-name>
    <group-name>group2</group-name>
</groups>
```

PDC module 170 also includes predefined user actions referred to herein as "process integration points." Because a primary task of PDC module 170 is to control submissions to and deletions from asset library 36, PDC module 170 provides a default method for request/approval processes. Process integration points allow library administrator 49 to customize the request/approval process.

When library administrator 49 has enabled a particular process integration point, control unit 172 directs the web browser of user 8 to a "submit request" page. A "submit request" page gives user 8 the opportunity to submit an asset request. For example, user 8 might submit a request to add the new software module she designed to library 36. The submission of this request triggers an event. This event, in turn, may trigger an approval/rejection process within the PDC process. This approval/rejection process may request approval of the artifact from a set of users. Subsequently, the approval/rejection process may receive replies from the set of users. The approval/rejection process may be aborted if any member of the set of users rejects the artifact. In the example, the supervisor of user 8 (where user 8 has been previously associated with the group role "supervisor" by a library administrator) might review the software module for defects before approving the inclusion of the software module into library 36.

By default, PDC module 170 defines an "ASSET_SUBMISSION" and an "ASSET_DELETION" process integration point. Library administrator 49 enables process integration points in the "enabled-processes" element of LPC document 174.

EXAMPLE

```
<enabled-processes>
   <process>
      <name>ASSET_DELETION</name>
   </process>
</enabled-processes>
```

When library administrator 49 enables a process integration point and user 8 requests an asset, control unit 172 creates and initializes an asset request record. PDC module 170 keeps such asset request records in an asset request record store 184. Each asset request record contains information regarding the current state of a user's request for an asset. Control unit 172 updates this asset request record as the request progresses through the approval process. An asset request record may contain the following information:

- Attributes that identify the specific context of this request: asset ID, group name, type of request, and the initiator of the request.
- The current state of the request.
- A collection of user notes.
- A history of what has occurred for this request
- A list of "approval instances" each containing a required group role, a state ("pending", "approved", or "rejected") and a user ID if the approval instance is in either the "approved" or "rejected" state.
- A collection of properties whose meaning is specific to the process.
- An "active" flag indicating whether the request represents an active process or exists to store historical data about a process that has completed.

The submission of a request causes an event that, in turn, may lead control unit 172 to invoke one or more listeners. The listeners involved in the approval process update the current state, the active status, and the pending approvers of an asset request record. For example, a process for an asset request may occur as follows:

1. User 8 submits a request for an asset through a user interface supplied by asset management system 6.
2. Control unit 172 creates and initializes an asset request record for the request.
3. The request for the asset causes an event that triggers a listener.
4. The listener notifies some set of users with designated role or roles in a particular group specified in the asset request record.
5. These users either approve or reject the asset request.
6. The approver's action to either approve or reject the asset request triggers a different listener. This listener, in turn, might notify users in another group role.
7. Upon reaching the final approval state of the asset request, a listener is triggered that performs the requested action (e.g. asset deletion). At this point the asset request record is marked as inactive.

Asset management system 6 may provide a graphical or textual user interface to facilitate any of these steps. In addition, asset management system 6 may provide an internal listener class called "GenericRequestHandler" that library administrator 49 can use to configure standard processes as shown here.

To facilitate the acceptance/rejection process, PDC module 170 supplies a special class of events associated with approval and rejection of an asset request. The act of approving an asset request generates an event of the form:

```
<request type>_<Group role>_APPROVED
```

For example: "ASSET_DELETION_Asset Owner_APPROVED"

Similarly, the act of rejecting an asset request generates an event of the form:

```
<request type>_<Group role>_REJECTED
```

For example: "ASSET_SUBMISSION_Asset Owner_REJECTED"

Figure 11:
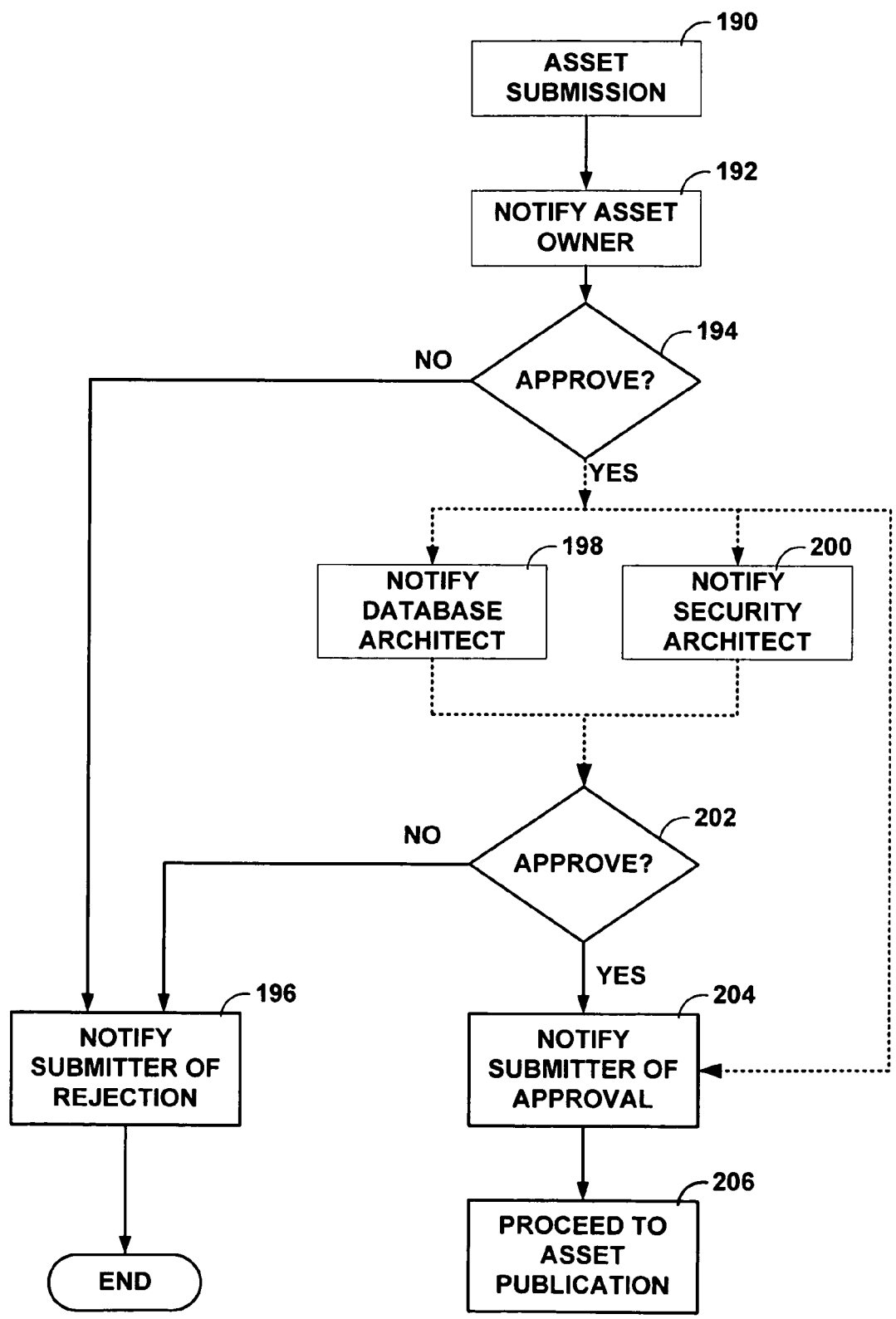
FIG. 11 is a flowchart illustrating an exemplary production and deployment control procedure.

FIG. 11 is a flowchart illustrating an exemplary approval/rejection process facilitated by PDC module 170. Initially, user 8 requests permission to submit an asset to asset management system 6 (190).

After user 8 has submitted the request, PDC module 170 automatically notifies (e.g., via an electronic message) the owners of the asset (192) and requests their approval or rejection (194). If the owners of the asset reject the request (e.g., via electronic messages), PDC module 170 informs user 8 that the asset owners have denied the request of user 8 (196). Else, if the asset owners approve the request, PDC module 170 simultaneously notifies a database architect (198) and a security architect (200) and requests their acceptance or rejection (202). Upon approval by both the database architect and the security architect, PDC module 170 allows the request of user 8 to proceed (206). Otherwise, if either the database architect or the security architect rejects the request of user 8, PDC module 170 informs user 8 of the rejection (196). However, for some types of assets, the approval of the security architect or the database architect might not be necessary. The dashed line of FIG. 11 indicates the provisional nature of their approval.

In order to implement the approval/rejection process outlined above, library administrator 49 may specify several elements of XML code within LPC document 174. These elements include process integration points, sets of group roles, sets of filters, sets of actions, and sets of listeners.

To specify that this is a procedure for submitting assets, library administrator 49 includes the following code to instruct control unit 172 to use the process integration point:

```
<enabled-processes>
   <process>
      <name>ASSET_SUBMISSION</name>
   </process>
</enabled-processes>
```

After specifying the use of the ASSET_SUBMISSION process integration point, library administrator 49 defines which groups are to be involved in the asset submission process:

```
<group-roles>
   <group-role>SecurityArchitect</group-role>
   <group-role>DatabaseArchitect</group-role>
</group-roles>
```

This "group-role" section specifies two roles for inclusion in the process: "SecurityArchitects" and "DatabaseArchitects."

These names may refer to roles associated with users in user data store 182. The user information in user data store 182 may specify the names and e-mail addresses of individuals and the group roles that the individual plays. Note that in this embodiment it might not be necessary to define the asset owner in the group-roles section of LPC document 174 because the asset owner is a predefined group role already built into PDC module 170.

Next, library administrator 49 specifies a set of filters. As mentioned above, filters define as set of conditions, such that when all of the conditions are fulfilled, the filter is triggered. In this example, there are four filters: "SecurityArchitectApprovalRequired", "SecurityArchitectApprovalNotRequired", "DatabaseArchitectApprovalRequired", and "DatabaseArchitectApprovalNotRequired". As the names suggest, these filters relate to whether the security architects and the database architects need to approve the submission.

Each of these filters uses the special "ASSET_SUBMISSION_Asset Owner_APPROVED" event defined in the ASSET_SUBMISSION process integration point. This means that control unit 172 does not make these filters true unless the asset owner has approved the request.

In addition, each filter references a classification criteria set: "SecurityApplicableAssets" or "DatabaseApplicableAssets". These classification criteria sets define which assets require the approval of the security architect or the database architect. Thus, for instance, if the "SecurityApplicableAssets" does not contain a certain asset type, then the security architect does not need to approve the submission of assets of that type. This property is reflected in the "SecurityArchitectApprovalNotRequired" filter. Specifically, the "complement=true" flag tells control unit 172 to make the "SecurityArchitectApprovalNotRequired" filter true when the asset is not of a type listed in the "SecurityApplicableAssets" set. Because security architect and database architect approval is not always necessary, the lines connecting item 194 to items 198 and 200, items 198 and 200 to item 202, and items 194 and 204 are dashed.

```
<filters>
    <filter name="SecurityArchitectApprovalRequired">
        <event>ASSET_SUBMISSION_Asset Owner_APPROVED</event>
        <classification-criteria-sets>
            <classification-criteria-set-name>SecurityApplicableAssets</classification-criteria-set-name>
        </classification-criteria-sets>
    </filter>
    <filter name="SecurityArchitectApprovalNotRequired">
        <event>ASSET_SUBMISSION_Asset Owner_APPROVED</event>
        <classification-criteria-sets complement="true"
            <classification-criteria-set-name>SecurityApplicableAssets</classification-criteria-set-name>
        </classification-criteria-sets>
    </filter>
    <filter name="DatabaseArchitectApprovalRequired">
        <event>ASSET_SUBMISSION_Asset Owner_APPROVED</event>
        <classification-criteria-sets>
            <classification-criteria-set-name>DatabaseApplicableAssets</classification-criteria-set-name>
        </classification-criteria-sets>
    </filter>
    <filter name="DatabaseArchitectApprovalNotRequired">
        <event>ASSET_SUBMISSION_Asset Owner_APPROVED</event>
        <classification-criteria-sets complement="true">
            <classification-criteria-set-name>DatabaseApplicableAssets</classification-criteria-set-name>
        </classification-criteria-sets>
    </filter>
</filters>
```

Now that library administrator 49 has specified the process integration point, the group-roles, and the filters, library administrator 49 can define the various actions that control unit 172 takes when an event or filter occurs. As mentioned before, an action informs control unit 172 which listener to invoke and whether control unit 172 should raise any subsequent events. Because FIG. 11 details a relatively complex approval/rejection process, library administrator 49 must define nine separate actions.

The first action is responsible for making control unit 172 notify the asset owner. Thus, when the "ASSET_SUBMISSION_REQUESTED" event occurs, control unit 172 invokes the "AssetOwnerNotification" listener (defined below). The flowchart of FIG. 11 reflects this action as step 192.

```
<actions>
    <action name="NotifyAssetOwner">
        <trigger-event>
            <event>ASSET_SUBMISSION_REQUESTED</event>
        </trigger-event>
        <listener>AssetOwnerNotification</listener>
    </action>
```

Library administrator 49 next specifies the actions relating to approval by the security architect and the database architect. These actions do not use an event as a trigger, but rather control unit 172 triggers these actions based on the filters defined above.

```
<action name="NotifySecurityArchitect">
    <trigger-event>
        <event-filter>SecurityArchitectApprovalRequired</event-filter>
    </trigger-event>
    <listener>SecurityArchitectNotification</listener>
</action>
<action name="NotifyDatabaseArchitect">
    <trigger-event>
        <event-filter>DatabaseArchitectApprovalRequired</event-filter>
    </trigger-event>
    <listener>DatabaseArchitectNotification</listener>
</action>
<action name="BypassSecurityArchitectApproval">
    <trigger-event>
        <event-filter>SecurityArchitectApprovalNotRequired</event-filter>
    </trigger-event>
    <result-event event=
    "ASSET_SUBMISSION_SecurityArchitect_APPROVED" />
</action>
<action name="BypassDatabaseArchitectApproval">.
    <trigger-event>
        <event-filter>DatabaseArchitectApprovalNotRequired</event-filter>
    </trigger-event>
    <result-event event=
    "ASSET_SUBMISSION_DatabaseArchitect_APPROVED" />
</action>
```

The "BypassSecurityArchitectApproval" and the "BypassDatabaseArchitectApproval" actions do not cause control unit 172 to invoke a listener. This is because control unit 172 does not need to perform further activities because approval of these groups is not necessary for the approval process to continue. Further note that these actions cause control unit 172 to raise an associated approval event.

Next, library administrator 49 creates an action that specifies what control unit 172 does when all required parties approve the submission:

```
<action name="ApproveSubmission" type="SYNCHRONIZED">
  <trigger-event>
    <event>ASSET_SUBMISSION_SecurityArchitect_APPROVED
    </event>
  </trigger-event>
  <trigger-event>
    <event>ASSET_SUBMISSION_DatabaseArchitect_APPROVED
    </event>
  </trigger-event>
  <listener>SubmissionApproval</listener>
  <result-event event="SUBMISSION_APPROVED" />
</action>
```

The "type=SYNCHRONIZED" flag tells control unit 172 to invoke the SubmissionApproval listener only when both of the trigger events have occurred.

Similarly, library administrator 49 creates an action that specifies what control unit 172 must do when a party rejects the submission. Notice in the XML code below that library administrator does not include the SYNCHRONIZED flag. This is because control unit 172 should reject the submission if any of the parties reject.

```
<action name="RejectSubmission">
  <trigger-event>
    <event>ASSET_SUBMISSION_Asset Owner_REJECTED</event>
  </trigger-event>
  <trigger-event>
    <event>ASSET_SUBMISSION_SecurityArchitect_REJECTED
    </event>
  </trigger-event>
  <trigger-event>
    <event>ASSET_SUBMISSION_DatabaseArchitect_REJECTED
    </event>
  </trigger-event>
  <listener>SubmissionRejection</listener>
</action>
```

Finally, library administrator 49 creates actions for the final submission of the asset or the deletion of the asset.

```
<action name="SubmitForPublish">
  <trigger-event>
    <event>SUBMISSION_APPROVED</event>
  </trigger-event>
  <listener>AssetSubmission</listener>
</action>
```

Now that library administrator 49 has completed the process integration point, group, filter, and action sections of LPC document 174, all that remains is to define the listeners.

```
<listener name="AssetOwnerNotification" class="GenericRequestHandler">
  <properties>
    <property name="request-type" value="ASSET_SUBMISSION" />
    <property name="request-state"
       value="Pending Asset Owner Approval"/>
    <property name="recipient-role" value="Asset Owner" />
    <property name="recipient-message-id"
       value="APPROVER_ACTION_REQUIRED" />
    <property name="lock-asset" value="true" />
    <property name="locking-user" value="support" />
  </properties>
</listener>
<listener name="SecurityArchitectNotification" class=
"GenericRequestHandler">
  <properties>
    <property name="request-type" value="ASSET_SUBMISSION" />
    <property name="request-state"
       value="Pending Architect Approvals" />
    <property name="recipient-role"
       value="SecurityArchitect" />
    <property name="recipient-message-id"
       value="APPROVER_ACTION_REQUIRED"/>
  </properties>
</listener>
<listener name="DatabaseArchitectNotification" class=
"GenericRequestHandler">
  <properties>
    <property name="request-type" value="ASSET_SUBMISSION" />
    <property name="request-state"
       value="Pending Architect Approvals" />
    <property name="recipient-role"
       value="DatabaseArchitect" />
    <property name="recipient-message-id"
       value="APPROVER_ACTION_REQUIRED" />
  </properties>
</listener>
<listener name="SubmissionApproval" class="GenericRequestHandler">
  <properties>
    <property name="request-type" value="ASSET_SUBMISSION"/>
    <property name="request-state" value="Approved" />
    <property name="terminate-request" value="true" />
    <property name="submitter-message-id"
       value="SUBMITTER_REQUEST_APPROVED" />
    <property name="lock-asset" value="false" />
  </properties>
</listener>
<listener name="SubmissionRejection" class="GenericRequestHandler">
  <properties>
    <property name="request-type" value="ASSET_SUBMISSION" />
    <property name="request-state" value="Rejected" />
    <property name="terminate-request" value="true" />
    <property name="submitter-message-id"
       value="SUBMITTER_REQUEST_REJECTED" />
    <property name="lock-asset" value="false" />
  </properties>
</listener>
```

In the preceding code each listener uses the built-in "GenericRequestHandler" class. The various properties associated with each of these listeners act as input parameters for a particular invocation of this class. In particular, each of these listeners provides GenericRequestHandler with information concerning how to update the asset request record and who to inform. For instance, in the "DatabaseArchitectNotification" listener, the listener specification tells GenericRequestHandler to update the "request-state" field of the asset request record to "Pending Architect Approvals". In addition, the "recipient-role" field tells GenericRequestHandler to notify "DatabaseArchitect." Note that specialized Listeners may be implemented to handle more complex approval mechanisms. For instance, a "majority rules" Listener could be implemented that accumulates approval/rejection votes from all users associated with a group role and raises the appropriate approval or rejection event based upon the results of the vote. Similarly, a "unanimous approval" Listener could be implemented that requires all users associated with a group role to vote in favor of approval in order for an approval event to be raised; otherwise a rejection event will occur. These examples are meant to be illustrative of the extended capabilities enabled by PDC Module 170.

Finally, library administrator 49 defines the "AssetSubmission" listener. The "AssetSubmission" listen is associated with the "AssetSubmissionListener" class. The "AssetSubmissionListener" class is another built-in class that contains instructions for control unit 172 to proceed with the asset submission as requested. This listener corresponds with item 206 of the flowchart in FIG. 11.

Put together, an LPC document corresponding to the flowchart of FIG. 11 may look like this:

```xml
<?xml version="1.0" encoding="UTF-8"?>
<logidex-process-config
    xmlns:xsi="http://www.w3.org/2001/XMLSchema-instance"
    xsi:noNamespaceSchemaLocation="process-configuration.xsd">
  <group-roles>
    <group-role>SecurityArchitect</group-role>
    <group-role>DatabaseArchitect</group-role>
  </group-roles>
  <enabled-processes>
    <process>
           <name>ASSET_SUBMISSION</name>
    </process>
  </enabled-processes>
  <listeners>
    <listener name="AssetOwnerNotification"
        class="GenericRequestHandlern>
      <properties>
        <property name="request-type"
           value="ASSET_SUBMISSION" />
        <property name="request-state"
           value="Pending Asset Owner Approval"/>
        <property name="recipient-role" value="Asset Owner" />
        <property name="recipient-message-id"
           value="APPROVER_ACTION_REQUIRED" />
        <property name="lock-asset" value="true"></property>
        <property name="locking-user" value="support" />
      </properties>
    </listener>
    <listener name="SecurityArchitectNotification"
        class="GenericRequestHandler">
      <properties>
        <property name="request-type" value="ASSET_SUBMISSION"
>
        <property name="request-state"
           value="Pending Architect Approvals" />
        <property name="recipient-role"
           value="SecurityArchitect" />
        <property name="recipient-message-id"
           value="APPROVER_ACTION_REQUIRED"/>
      </properties>
    </listener>
    <listener name="DatabaseArchitectNotification"
        class="GenericRequestHandler"?
      <properties>
        <property name="request-type" value=
           "ASSET_SUBMISSION" />
        <property name="request-state"
           value="Pending Architect Approvals" />
        <property name="recipient-role"
           value="DatabaseArchitect" />
        <property name="recipient-message-id"
           value="APPROVER_ACTION_REQUIRED" />
      </properties>
    </listener>
    <listener name="SubmissionApproval"
        class="GenericRequestHandler">
      <properties>
        <property name="request-type"
           value="ASSET_SUBMISSION"/>
        <property name="request-state" value="Approved" />
        <property name="terminate-request" value="true" />
        <property name="submitter-message-id"
           value="SUBMITTER_REQUEST_APPROVED"/>
        <property name="lock-asset" value="false" />
      </properties>
    </listener>
    <listener name="SubmissionRejection"
        class=""GenericRequestHandlern>
      <properties>
        <property name="request-type"
 value="ASSET_SUBMISSION"/>
        <property name="request-state" value="Rejected" />
        <property name="terminate-request" value="true" />
        <property name="submitter-message-id"
           value="SUBMITTER_REQUEST_REJECTED" />
        <property name="lock-asset" value="false" />
      </properties>
    </listener>
    <listener name="AssetSubmission" class="AssetSubmissionListener"
/>
  </listeners>
  <filters>
    <filter name="SecurityArchitectApprovalRequired">
      <event>ASSET_SUBMISSION_Asset Owner_APPROVED</event>
      <classification-criteria-sets>
        <classification-criteria-set-
name>SecurityApplicableAssets</classification-criteria-set-name>
      </classification-criteria-sets>
    </filter>
    <filter name="SecurityArchitectApprovalNotRequired">
      <event>ASSET_SUBMISSION_Asset Owner_APPROVED</event>
      <classification-criteria-sets complement="true">
        <classification-criteria-set-
name>SecurityApplicableAssets</classification-criteria-set-name>
      </classification-criteria-sets>
    </filter>
    <filter name="DatabaseArchitectApprovalRequired">
      <event>ASSET_SUBMISSION_Asset Owner_APPROVED</event>
      <classification-criteria-sets>
        <classification-criteria-set-
name>DatabaseApplicableAssets</classification-criteria-set-name>
      </classification-criteria-sets>
    </filter>
    <filter name="DatabaseArchitectApprovalNotRequired">
      <event>ASSET_SUBMISSION_Asset Owner_APPROVED</event>
      <classification-criteria-sets complement="true">
        <classification-criteria-set-
name>DatabaseApplicableAssets</classification-criteria-set-name>
      </classification-criteria-sets>
    </filter>
  </filters>
  <actions>
    <action name="NotifyAssetOwner">
      <trigger-event>
        <event>ASSET_SUBMISSION_REQUESTED</event>
      </trigger-event>
      <listener>AssetOwnerNotification</listener>
    </action>
    <action name="NotifySecurityArchitect">
      <trigger-event>
    <event-filter>SecurityArchitectApprovalRequired</event-filter>
      </trigger-event>
      <listener>SecurityArchitectNotification</listener>
    </action>
    <action name="NotifyDatabaseArchitect">
      <trigger-event>
        <event-filter>DatabaseArchitectApprovalRequired
        </event-filter>
      </trigger-event>
      <listener>DatabaseArchitectNotification</listener>
    </action>
    <action name="BypassSecurityArchitectApproval">
      <trigger-event>
        <event-filter>SecurityArchitectApprovalNotRequired
        </event-filter>
      </trigger-event>
      <result-event
        event="ASSET_SUBMISSION_SecurityArchitect_
          APPROVED" />
    </action>
    <action name="BypassDatabaseArchitectApproval">
      <trigger-event>
        <event-filter>DatabaseArchitectApprovalNotRequired
        </event-filter>
      </trigger-event>
      <result-event
        event="ASSET_SUBMISSION_DatabaseArchitect_
          APPROVED" />
    </action>
```

-continued

```
<action name="ApproveSubmission" type="SYNCHRONIZED">
    <trigger-event>
        <event>ASSET_SUBMISSION_SecurityArchitect_
            APPROVED</event>
    </trigger-event>
    <trigger-event>
        <event>ASSET_SUBMISSION_DatabaseArchitect_
            APPROVED</event>
    </trigger-event>
    <listener>SubmissionApproval</listener>
    <result-event event="SUBMISSION_APPROVED" />
</action>
<action name="RejectSubmission">
    <trigger-event>
        <event>ASSET_SUBMISSION_Asset Owner_
            REJECTED</event>
    </trigger-event>
    <trigger-event>
        <event>ASSET_SUBMISSION_SecurityArchitect_
            REJECTED</event>
    </trigger-event>
    <trigger-event>
        <event>ASSET_SUBMISSION_DatabaseArchitect_
            REJECTED</event>
    </trigger-event>
    <listener>SubmissionRejection</listener>
</action>
<action name="SubmitForPublish">
    <trigger-event>
        <event>SUBMISSION_APPROVED</event>
    </trigger-event>
    <listener>AssetSubmission</listener>
</action>
</actions>
</logidex-process-config>
```

Various embodiments of the invention have been described. These and other embodiments are within the scope of the following claims.

The invention claimed is:

1. A computer-implemented system comprising:
one or more computers;
a set of repositories configured to store electronic artifacts, at least one or more of the artifacts comprising software instructions;
a set of asset sources executing on the one or more computers, the set of asset sources being configured to monitor the repositories and to generate software assets in a normalized format upon detecting new or changed artifacts in the repositories, each of the software assets representing a set of related artifacts in the repositories that is reusable in different software development environments; and
an asset management system executing on the one or more computers, the asset management system being configured to capture the software assets from the asset sources, to store the software assets in an asset library, and to operate in accordance with a control process when the asset management system captures the software assets generated by the asset sources and stores the software assets, the control process being customizable by an administrator of the asset management system, the asset management system comprising:
a library process control (LPC) document that defines the control process, and
a control unit that processes the LPC document and performs the control process based on the content of the LPC document.

2. The system of claim 1,
wherein the LPC document comprises a set of preconditions and a set of actions, and
wherein the asset management system performs an action in the set of actions when all preconditions associated with the action in the set of preconditions are satisfied.

3. The system of claim 2, wherein the control process evaluates the set of preconditions to determine whether all preconditions associated with the action are satisfied.

4. The system of claim 2, wherein a precondition in the set of preconditions comprises approval from a set of users defined in the LPC document.

5. The system of claim 2, wherein the action refers to a listener definition, wherein the listener definition contains a reference to an implementation that encapsulates substantive behavior of the asset management system.

6. The system of claim 5, wherein the implementation is external to the asset management system.

7. The system of claim 1, wherein the LPC document conforms to the extensible markup language (XML).

8. The system of claim 1, further comprising a graphical interface by which the administrator edits the LPC document.

9. The system of claim 1, wherein the LPC document defines a default procedure and the asset management system operates in accordance with the default procedure.

10. The system of claim 1, wherein the LPC document defines the control process to a procedure for approval or rejection of the asset, and the asset management system operates in accordance with the procedure.

11. The system of claim 10, wherein the procedure for approval or rejection of the asset comprises requesting approval of the artifact from a set of users defined in the LPD document, receiving replies form the set of users, and aborting the control process if any member of the set of users rejects the artifact.

12. The system of claim 1, wherein the asset management system performs the control process in response to an event.

13. The system of claim 12, wherein the event is a notification from one of the asset sources that the one of the asset sources has generated a software asset.

14. The system of claim 1, wherein the control process governs how the asset management system handles requests to retrieve a software asset from the asset library.

15. The system of claim 1, wherein the normalized form of the software assets complies with a computer data description language.

16. The system of claim 15, wherein the computer data description language comprises the extensible markup language (XML).

17. The system of claim 1, wherein the asset sources comprise a writable interface for editing the software assets.

18. The system of claim 1, wherein the asset management system comprises an asset capture module to update the software assets based on additional artifacts.

19. The system of claim 18, wherein the asset capture module includes a user interface to receive the additional artifacts from a user.

20. The system of claim 18, wherein the asset capture module includes a script to generate the additional artifacts.

21. The system of claim 18,
wherein an asset template defines a schema for the software assets in accordance with a computer data description language; and
wherein the asset capture module updates the software assets in accordance with the asset template.

22. The system of claim 21, wherein the asset capture module identifies missing artifacts from the software assets based on the asset template.

23. The system of claim 1,
wherein the asset management system further comprises a rules engine to generate metadata that maps the software assets to elements of one or more models that provide formal representations of the artifacts; and
wherein the asset management system further comprises an asset retrieval module to selectively retrieve a software asset from the asset library based on the metadata.

24. The system of claim 23,
wherein the asset retrieval module receives user input from a user, wherein the input comprises one or more elements of the models; and
wherein the asset retrieval module selectively retrieves a software asset from the asset library based on the user input and the models.

25. The system of claim 23, wherein the models comprises at least one of a process model, a structural model, a resource model, and an implementation model.

26. The system of claim 1, wherein the artifacts comprise one of source code, binary code, a requirements specification, a design document, a model, a use case, and a collaboration diagram.

27. The system of claim 1,
wherein the set of asset sources comprise a multi-level hierarchy of asset sources executing on one or more computers to monitor the repositories and to generate software assets upon detecting a new or updated artifact,
wherein higher-level asset sources of the hierarchy receive software assets from lower-level asset sources of the hierarchy and combine the received software assets to form aggregate software assets,
wherein the asset management system receives the aggregate software assets from the hierarchy of asset sources and stores the aggregate software assets within the asset library, and
wherein the control process governs how the asset management system captures the aggregate software assets and stores the aggregate software assets.

28. The system of claim 27, wherein the asset management system further comprises at least two asset capture tools communicatively coupled to different asset sources of different levels of the hierarchy.

29. A method comprising:
storing, with a set of repositories, electronic artifacts, at least one or more of the artifacts comprising software instructions;
executing, with one or more computers, a set of asset sources that monitors the repositories and generates software assets in a normalized format upon detecting a new or changed artifact in the repositories, wherein each of the software assets represents a set of related artifacts in the repositories that is reusable in different software development environments; and
executing, with the one or more computers, an asset management system that captures the software assets from the asset sources, stores the software assets in an asset library, and operates in accordance with a control process when the asset management system captures the software assets generated by the asset sources and stores the software assets, the control process being customizable by an administrator of the asset management system, wherein executing the asset management system comprises:
processing a library process control (LPC) document that defines the control process; and
performing the control process based on the content of the LPC document.

30. The method of claim 29, wherein the LPC document is specified by the administrator.

31. The method of claim 29, wherein performing the control process comprises:
evaluating whether a set of preconditions defined in the LPC document are satisfied; and
performing an action defined in the LPC document when all preconditions that are associated with the action in the set of preconditions are satisfied.

32. The method of claim 31, wherein evaluating a set of preconditions comprises evaluating whether a set of users has indicated approval.

33. The method of claim 31, wherein performing the action comprises:
accessing an implementation of the action specified by the LPC document;
transferring properties specified in the LPC document to the implementation; and
receiving a result from the implementation.

34. The method of claim 33, wherein the implementation is located on a remote system.

35. The method of claim 29, wherein performing the control process comprises:
requesting approval of the artifact from a set of users;
receiving replies from the set of users; and
aborting the process if any member of the set of users rejects the artifact.

36. The method of claim 35, wherein requesting approval comprises sending an electronic message to the set of users.

37. The method of claim 35, wherein receiving replies comprises receiving an electronic message from the set of users.

38. The method of claim 29, wherein the LPC document conforms to the extensible markup language (XML).

39. The method of claim 29, wherein the normalized format of the software assets conforms to the extensible markup language (XML).

40. The method of claim 29, wherein the asset sources generate the software assets in accordance with an asset template that defines a schema for the software assets.

41. The method of claim 29, wherein the asset sources identify additional artifacts required for the software assets and invoke an asset capture module in the asset management system to update the software assets to include the additional artifacts.

42. The method of claim 29,
wherein the software assets comprise metadata that maps the software assets to elements of one or more models that provide formal representations of the artifacts; and
wherein the method further comprises:
receiving input from a user, wherein the input comprises one or more elements of the models; and
retrieving software assets from the asset library based on the elements of the model in the input and the metadata of the software assets.

43. The method of claim 42, wherein executing the asset management system comprises customizing the control process to govern how the asset management system retrieves the software assets from the asset library.

44. The method of claim 29, wherein the artifact comprises one of source code, binary code, a requirements specification, a design document, a model, a use case, and a collaboration diagram.

45. The method of claim 29,
wherein the set of asset sources comprise a multi-level hierarchy of asset sources executing on one or more computers to monitor the repositories and to generate software assets upon detecting a new or updated artifact, wherein higher-level asset sources of the hierarchy receive software assets from lower-level asset sources of the hierarchy and combine the received software assets to form aggregate software assets, wherein the asset management system receives the aggregate software assets from the hierarchy of asset sources and stores the aggregate software assets within the asset library, and wherein performing the control process comprises governing how the asset management system captures the aggregate software assets and stores the aggregate software assets.

46. A non-transitory computer-readable medium comprising instructions to cause one or more processors to:

store electronic artifacts in a set of repositories, at least one or more of the artifacts comprising software instructions;

execute a set of asset sources that monitors the repositories and generates software assets in a normalized format upon detecting a new or changed artifact in the repositories, wherein each of the software assets represents a set of related artifacts in the repositories that is reusable in different software development environments; and execute an asset management system that captures the software assets from the asset sources, stores the software assets in an asset library, and operates in accordance with a control process when the asset management system captures the software assets generated by the asset sources and stores the software assets, the control process being customizable by an administrator of the asset management system, wherein the instructions to cause the one or more processors to execute the asset management system comprise instructions to cause the one or more processors to:

process a library process control (LPC) document that defines the control process; and perform the control process based on the content of the LPC document.

* * * * *